US008890934B2

(12) United States Patent
Li et al.

(10) Patent No.: US 8,890,934 B2
(45) Date of Patent: Nov. 18, 2014

(54) STEREOSCOPIC IMAGE ALIGNING APPARATUS, STEREOSCOPIC IMAGE ALIGNING METHOD, AND PROGRAM OF THE SAME

(75) Inventors: Bo Li, Singapore (SG); Pongsak Lasang, Singapore (SG); Chin Phek Ong, Singapore (SG); Sheng Mei Shen, Singapore (SG); Junichi Tagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 13/320,640

(22) PCT Filed: Mar. 14, 2011

(86) PCT No.: PCT/JP2011/001455
§ 371 (c)(1),
(2), (4) Date: Feb. 29, 2012

(87) PCT Pub. No.: WO2011/114683
PCT Pub. Date: Sep. 22, 2011

(65) Prior Publication Data
US 2012/0147139 A1 Jun. 14, 2012

(30) Foreign Application Priority Data
Mar. 19, 2010 (JP) .................................. 2010-065185

(51) Int. Cl.
*H04N 15/00* (2006.01)
(Continued)

(52) U.S. Cl.
CPC ............ *G03B 35/08* (2013.01); *H04N 13/0239* (2013.01); *H04N 13/0475* (2013.01);
(Continued)

(58) Field of Classification Search
CPC .................... H04N 13/0055; H04N 19/00769; H04N 13/0239; H04N 13/0059; H04N 13/0048; G06T 19/00; G06T 17/20; G06T 17/00; G06T 15/10; G06T 15/00
USPC ............................................ 348/43; 345/419
See application file for complete search history.

(56) References Cited

U.S. PATENT DOCUMENTS 6,191,809 B1   2/2001   Hori et al.
6,606,404 B1   8/2003   Zhang et al.
(Continued)

FOREIGN PATENT DOCUMENTS

JP   2001-517414   10/2001
JP   2002-324234   11/2002
(Continued)

OTHER PUBLICATIONS

European Search Report issued May 26, 2014 in European Patent Application No. 11755876.7.
(Continued)

*Primary Examiner* — Dave Czekaj
*Assistant Examiner* — Tsion B Owens
(74) *Attorney, Agent, or Firm* — Wenderoth, Lind & Ponack, L.L.P.

(57) ABSTRACT

A stereoscopic image aligning apparatus (200) automatically aligns image pairs for stereoscopic viewing in a shorter amount of time than conventional apparatuses, which is applicable to image pairs captured by a single sensor camera or a variable baseline camera, without relying on camera parameters. The stereoscopic image aligning apparatus (200) includes: an image pair obtaining unit (205) obtaining an image pair including a left-eye image and a right-eye image corresponding to the left-eye image; a corresponding point detecting unit (252) detecting a corresponding point representing a set of a first point included in a first image that is one of the images of the image pair and a second point included in a second image that is the other of the images of the image pair and corresponding to the first point; a first matrix computing unit (254) computing a homography transformation matrix for transforming the first point such that a vertical parallax between the first and second points is smallest and an epipolar constraint is satisfied; a transforming unit (260) transforming the first image using the homography transformation matrix; and an output unit (210) outputting: a third image that is the transformed first image; and the second image.

17 Claims, 15 Drawing Sheets

(51) Int. Cl.
*G06T 15/00* (2011.01)
*H04N 13/00* (2006.01)
*G03B 35/08* (2006.01)
*H04N 13/02* (2006.01)
*H04N 13/04* (2006.01)

(52) U.S. Cl.
CPC ...... *H04N 13/0022* (2013.01); *H04N 13/0018* (2013.01); *H04N 13/0007* (2013.01); *H04N 13/026* (2013.01); *H04N 13/0221* (2013.01); *H04N 2013/0074* (2013.01)
USPC .......................................... 348/43; 345/419

(56) References Cited

U.S. PATENT DOCUMENTS

| | | | |
|---|---|---|---|
| 7,113,632 | B2 | 9/2006 | Lee et al. |
| 7,343,035 | B1 | 3/2008 | Payton |
| 2003/0151659 | A1 | 8/2003 | Kawano et al. |
| 2003/0156751 | A1 | 8/2003 | Lee et al. |
| 2009/0304264 | A1 | 12/2009 | Au et al. |
| 2010/0026786 | A1 | 2/2010 | Link |
| 2012/0019530 | A1* | 1/2012 | Baker .......................... 345/419 |

FOREIGN PATENT DOCUMENTS

| | | |
|---|---|---|
| JP | 2003-244500 | 8/2003 |
| WO | 99/37098 | 7/1999 |

OTHER PUBLICATIONS

Hartley Richard et al: "Multiple View Geometry in Computer Vision, Structure Computation". Jul. 31, 2000. Multiple View Geometry in Computer Vision. Cambridge University Press. GB. p. 295-311. XP002521742. ISBN: 978-0-521-62304-9.

International Search Report issued May 17, 2011 in International (PCT) Application No. PCT/JP2011/001455.

C. Loop et al., "Computing Rectifying Homographies for Stereo Vision", Microsoft Research, Technical Report MSR-TR-99-21, 1999.

D. Lowe, "Object recognition from local scale-invariant features", International Conference on Computer Vision, Sep. 1999.

H. Bay et al., "SURF: Speeded up robust features", European Conference on Computer Vision, 2006.

R. Hartley et al., "Multiple View Geometry in Computer Vision", Cambridge University Press, London, 2000, pp. 239-261, 279-309, 325-343.

X. Armangué et al., "Overall view regarding fundamental matrix estimation", Image and Vision Computing, 2003, vol. 21, pp. 205-220.

Z. Zhang, "Determining the epipolar geometry and its uncertainty: a review", International Journal of Computer Vision, 1998, vol. 27, pp. 161-198.

* cited by examiner

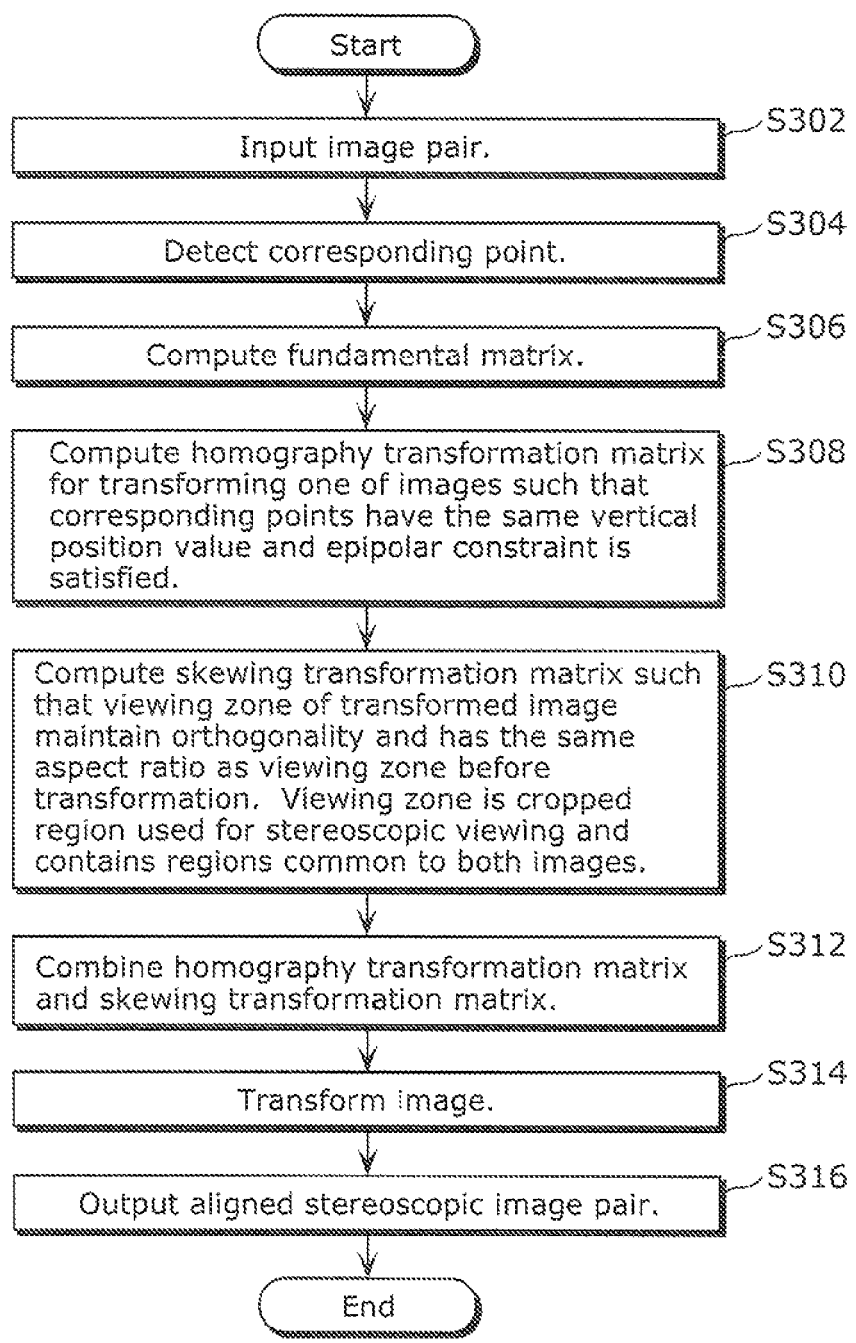

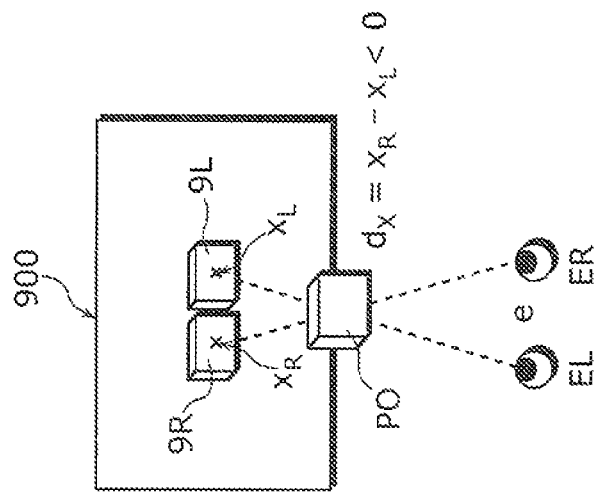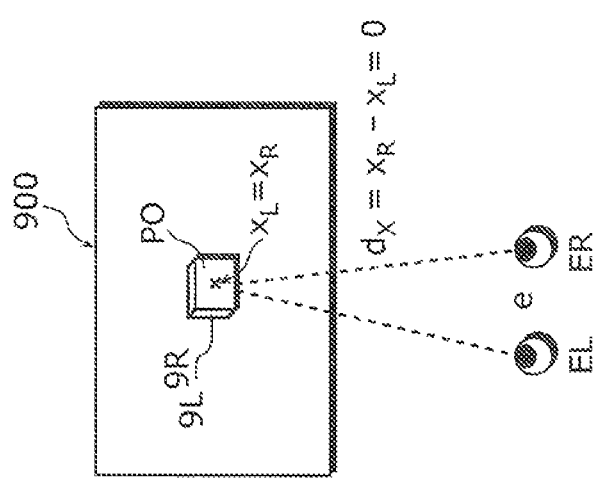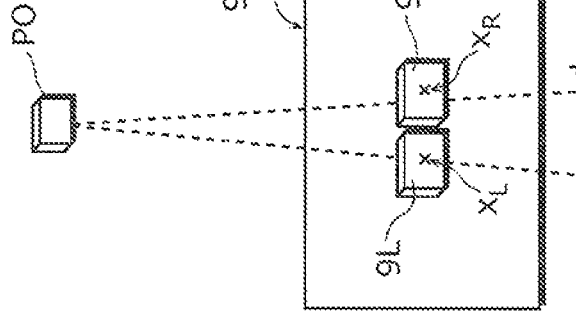

STEREOSCOPIC IMAGE ALIGNING APPARATUS, STEREOSCOPIC IMAGE ALIGNING METHOD, AND PROGRAM OF THE SAME

TECHNICAL FIELD

The present invention relates to stereoscopic image aligning apparatuses which detect corresponding points from plural image pairs and align the detected corresponding points to meet a certain criterion. The present invention relates particularly to a stereoscopic image aligning apparatus and the like, which aligns an image pair to allow stereoscopic viewing on a stereoscopic display device.

BACKGROUND ART

Stereoscopic imaging has been studied for many years in the art. Stereoscopic images allow the perception of depth so to bring viewers with the presence feeling, which has become a hot and promising topic now for home entertainment industry. Stereoscopic imaging is also widely used in applications ranging from military navigation, medical imaging, industrial inspection, to consumer electronics, etc. The principles of stereoscopic imaging and displays are well known. To be specific, each of a left-eye image and a right-eye image which constitute an image pair is taken from slightly different viewpoints, which usually are viewpoints with displacements in a horizontal direction). By separately presenting the left-eye image to the left eye and the right-eye image to the right eye, the human brain will combine them and perceive their disparities as depth.

Conventionally, the image pair can be acquired using capturing devices with two image sensors (e.g. a digital stereo camera). If the captured image pair is properly aligned, comfortable 3D feeling is sensed by the viewers/observers when seen. Unfortunately, the captured image pair is usually not well aligned (for many reasons). For example, alignment of the two image sensors (including optical system) during manufacturing is not perfect. Moreover, the captured images may be distorted due to lens distortion or camera configurations. These can result in horizontal and vertical differences. The difference in the vertical direction and the horizontal direction between two images is known as parallax in general. In order to reduce visual discomfort and eyestrain of the observer and obtain stereoscopic viewing effect, at least vertical parallax must be removed and horizontal parallax needs to be properly adjusted.

In addition, the image pair can be captured using single image sensor devices by sequentially capturing from different viewpoints. More specifically, by capturing an image, moving the camera, and capturing another image, an image pair for stereoscopic viewing can be obtained. There are two advantages of using single sensor devices. One advantage is lower cost compared with two (stereo) sensor devices. Another advantage is the flexibility to change the distance between a left image and a right image according to content of the scene. However, the main problem with this method is the misalignment of the left image and the right image, mainly due to hand movement when using handheld DSC (Digital Still Camera).

Patent Literature 1 (U.S. Pat. No. 6,191,809, issued on Feb. 20, 2001) discloses a method and apparatus for correcting optical misalignment of stereo image capturing system, for example electronic stereo endoscope. The method uses calibration target to compute translation, rotation, and scale, thereby determining calibrated information. Then, the determined calibrated information is used to align image pairs.

Patent Literature 2 (Japanese Unexamined Patent Application Publication No. 2003-244500) discloses an image pickup system for obtaining the stereo image of an object by time sequentially capturing left and right parallax images. In this invention, LCD viewfinder is used for guiding the users to align the two images during capturing.

Patent Literature 3 (U.S. Pat. No. 7,113,632, issued on Sep. 26, 2006) discloses a method for determining rectification transformation of a pair of images.

Patent Literature 4 (U.S. Pat. No. 6,606,404, filed on Jun. 19, 1999) discloses system and method for computing rectifying homographies for stereo vision processing of three dimensional objects. The object of Patent Literature 4 is to transform left and right images such that the epipoles is mapped to the infinity points and the epipolar lines are parallel with the horizontal axis. This method can output images which are suitable for stereoscopic viewing.

CITATION LIST

Patent Literature

[PTL 1] U.S. Pat. No. 6,191,809
[PTL 2] Japanese Unexamined Patent Application Publication No. 2003-244500
[PTL 3] U.S. Pat. No. 7,113,632
[PTL 4] U.S. Pat. No. 6,606,404

Non Patent Literature

[NPL 1] D. Lowe, "Object recognition from local scale-invariant features", International Conference on Computer Vision, 1999
[NPL 2] H. Bay, et al., "SURF: Speeded up robust features", European Conference on Computer Vision, 2006
[NPL 3] R. Hartley and A. Zisserman, "Multiple View Geometry in Computer Vision", Cambridge University Press London, 2000
[NPL 4] X. Armangue and J. Salvi, "Overall view regarding fundamental matrix estimation", Image and Vision Computing, 2003, Vol. 21, p. 205-220
[NPL 5] Z. Zhang, "Determining the epipolar geometry and its uncertainty: a review", International Journal of Computer Vision, 1998, Vol. 27, p. 161-198

SUMMARY OF INVENTION

Technical Problem

The method disclosed by PTL 1 does not work if the camera position is altered, for example, due to shock. This method is not suitable for an image pair captured with single sensor devices. This method is also not suitable for a variable baseline stereo camera.

In addition, with the method disclosed by PTL 2, the quality and the accuracy of the alignment rely heavily on users' skill. It can take long for a user to adjust the alignment, which causes inconvenient. This method is not automatic.

In addition, the method disclosed by PTL 3 is specifically designed for the case of stereo camera wherein the distance between the two sensors is fixed and the left and right images are captured at the same time. This method is not suitable for an image pair captured with single sensor devices. This method is also not suitable for a variable baseline stereo camera.

In addition, with the method disclosed by PTL 4, the epipoles is mapped to the infinity points and the epipolar lines are parallel with the horizontal axis; however, for stereoscopic viewing it is not necessary for the epipoles to be mapped to infinity and it is not necessary for epipolar lines to be parallel with the horizontal axis. This method is more complex than necessary for aligning an image pair for stereoscopic viewing.

In view of the above, an object of the present invention is to provide a stereoscopic image aligning apparatus and the like for aligning an image pair for stereoscopic viewing, which automatically aligns image pairs for stereoscopic viewing in a shorter amount of time than conventional apparatuses, which are applicable to image pairs captured by a single sensor camera or a variable baseline camera, without relying on camera parameters.

Solution to Problem

In order to solve the above-described problems, a stereoscopic image aligning apparatus according to an aspect of the present invention includes: an image pair obtaining unit configured to obtain an image pair including a left-eye image and a right-eye image that corresponds to the left-eye image; a corresponding point detecting unit configured to detect a corresponding point that represents a set of a first point and a second point, the first point being included in a first image that is one of the images of the image pair, and the second point being included in a second image that is the other of the images of the image pair and corresponding to the first point; a first matrix computing unit configured to compute a homography transformation matrix for transforming the first point such that a vertical parallax between the first point and the second point is smallest and an epipolar constraint is satisfied; a transforming unit configured to transform the first image using the homography transformation matrix; and an output unit configured to output a third image and the second image, the third image being the transformed first image.

According to the above-described configuration, the stereoscopic image aligning apparatus can perform alignment so as to remove parallax in the vertical direction between a left image and a right image included in a image pair. In general, the parallax necessary for stereoscopic viewing is the parallax in the horizontal direction, and the parallax in the vertical direction interferes with the effect of natural stereoscopic viewing. The stereoscopic image aligning apparatus according to an embodiment of the present invention is particularly effective in the case where a stereoscopic viewing image is created by capturing the left image and the right image over twice capturing using a normal digital still camera which includes only one lens and image sensor. The method of computing a homography transformation matrix according to an embodiment of the present invention can be automated using a calculator and can be applied to an image pair captured using a single sensor camera or a variable baseline camera, without relying on a camera parameter. In addition, since only one of two images included in the image pair is transformed based on the other image so as to remove the parallax in the vertical direction between the two images, only a half amount of computation is sufficient compared to the conventional techniques with which two images are processed. Therefore, it is possible to perform computation in a shorter amount of time compared to the conventional techniques.

To be specific, the image pair obtaining unit may obtain, as the image pair, two images concurrently captured using (i) two image sensors and two lenses, (ii) one image sensor and two lenses, or (iii) two image sensors and one lens.

In addition, the image pair obtaining unit may obtain, as the image pair, two images captured at different times from different viewpoints, using one image sensor and one lens.

In addition, the stereoscopic image aligning apparatus according to an aspect of the present invention may further include: a second matrix computing unit configured to compute a skewing transformation matrix for transforming the third image such that a coordinate system of the third image has orthogonality and the third image has a same aspect ratio as an aspect ratio of the first image; and a matrix combining unit configured to generate a combined transformation matrix by combining the homography transformation matrix and the skewing transformation matrix, and the transforming unit may transform the first image using the combined transformation matrix.

According to the above-described configuration, the second matrix computing unit computes a skewing transformation matrix for transforming the third image such that a coordinate system of the skewed third image has orthogonality (more specifically, a horizontal axis and a vertical axis in an image plane are perpendicular) and the third image has the same aspect ratio as the aspect ratio of the first image. This allows outputting the obtained image pair as an image pair with higher accuracy for stereoscopic viewing.

In addition, the stereoscopic image aligning apparatus according to an aspect of the present invention may further include: a viewing zone computing unit configured to compute a viewing zone that is a region common to the first image and the second image, and the second matrix computing unit may compute the skewing transformation matrix such that a coordinate system of a portion included in the viewing zone of the third image has the orthogonality and the portion included in the viewing zone of the third image has a same aspect ratio as an aspect ratio of a portion included in the viewing zone of the first image.

According to the above-described configuration, it is possible to remove in advance, using the viewing zone calculating unit, an image region that interferes with the effect of stereoscopic viewing. As a result, it is possible to reduce the amount of processing time by performing the processing only on the image region effective for comfortable stereoscopic viewing and to output the image pair allowing more comfortable stereoscopic viewing.

In addition, the corresponding point detecting unit may select small regions evenly distributed in a predetermined area extending from a center of each of the first image and the second image included in the image pair and detect the corresponding point from the small regions.

According to the above-described configuration, the corresponding point detecting unit can detect a target point, focusing on a region where a corresponding point can be detected more easily, among the regions included in the target image. As a result, the accuracy in detecting a corresponding point increases, and thus it is possible to more accurately perform the image correction processing using the homography transformation matrix.

In addition, the stereoscopic image aligning apparatus according to an aspect of the present invention may further include a blur region detecting unit configured to detect a blur region in the image pair, and the corresponding point detecting unit may detect the corresponding point from regions other than the blur region in the image pair.

In general, it is difficult to detect a corresponding point from a blur region. Thus, by removing the blur region in advance according to the above-described configuration, it is possible to improve the accuracy in detecting the corresponding point performed by the corresponding point detecting unit.

In addition, the output unit may obtain adjustment information that indicates at least one of an input operation from a viewing user, a size of a display device, and a distance between the display device and the viewing user, and adjust and output at least one of a parallax between the third image and the second image, a three-dimensional (3D) pop-up effect, and a 3D deep-in effect, based on the adjustment information.

According to the above-described configuration, the output unit can provide an output image, based on the current context, with optimal stereoscopic viewing effects according to an index of comfort, safety, and so on.

In addition, the image pair obtaining unit may (A) obtain a plurality of image pair candidates each of which is a candidate for the image pair, (B) specify, for each of the image pair candidates, a common viewing zone that is a viewing zone common to the image pair candidate and an other image pair candidate and obtain quality information that is information related to at least one of an amount of light, brightness, color, and definition, in the common viewing zone, and (C) select, as the image pair, one of the image pair candidates having a highest image quality indicated by the quality information.

According to the above-described configuration, the image pair obtaining unit, even when a large number of images to be an image pair are obtained, can select as an image pair, from among the images to be a image pair, images which allow stereoscopic viewing effects with high quality.

In addition, when (i) an image group is encoded and stored in a memory card or (ii) the image group is encoded and transmitted from an external device through a network, the image pair obtaining unit may decode the encoded image group, the image group including the left-eye image and the right-eye image.

According to the above-described configuration, the image pair obtaining unit can perform correction which enables more suitable stereoscopic viewing on an image obtained via an external storage media or a communicate network.

In addition, the corresponding point detecting unit may compute a rotation parameter and a shift parameter so as to match the rotation parameter and the shift parameter to an output from a Gyro sensor that outputs information corresponding to a rotation angle, the rotation parameter and the shift parameter being for use in generating the homography transformation matrix According to the above-described configuration, the corresponding point detecting unit can compute a corresponding point with higher speed and accuracy, by using a corresponding point detecting algorithm according to related techniques in combination with an actual measured value using Gyro sensor.

It should be noted that the present invention can be implemented, in addition to implementation as the above-described stereoscopic image aligning apparatus, as a method including, as steps, the characteristic components included in the stereoscopic image aligning apparatus, or as a program which causes a computer to execute the characteristic steps. Further, such a program may be distributed via recording medium such as a CD-ROM (compact disc read only memory) and transmission medium such as the Internet.

Furthermore, the present invention can be implemented as a semiconductor integrated circuit (LSI) which implements part or all of the functions of such a stereoscopic image aligning apparatus, or as a stereoscopic image aligning system that includes such a stereoscopic image aligning apparatus.

Advantageous Effects of Invention

A stereoscopic image aligning apparatus and the like can be provided which automatically align image pairs for stereoscopic viewing in a shorter amount of time than conventional apparatuses and which are applicable to image pairs captured by a single sensor camera or a variable baseline camera, without relying on camera parameters.

More specifically, since the processes can be automatically carried out according to the present invention, advantageous effects that surpass the conventional technique in PTL 2 are produced. In addition, the present invention does not rely on a calibration target and thus has advantage over the conventional technique in PTL 1. In addition, the present invention is designed for single sensor single sensor cameras and can also be applied for image pairs captured by variable baseline double sensor cameras and thus has advantageous effects that surpass the conventional technique in PTL 1 and PTL 3.

Another advantage is explained using FIG. 5a, FIG. 5b, and FIG. 5c. The method in PTL 4 aims to achieve alignment (rectification) with which the orientation of a camera and an image which are indicated as a left image 402 and a right image 404 in FIG. 5a is changed to the orientation indicated as a rectified left image 406 and a rectified right image 408 in FIG. 5b. Here, the epipoles are mapped to infinity and the epipolar lines are parallel to the horizontal axis. The present invention does not aim to achieve this. Instead, the present invention aims to achieve the alignment shown in FIG. 5c. Here, the vertical parallax is minimized, and the aspect ratio and orthogonality of the viewing zone is preserved (which will be explained in the embodiment). The right image 404 is transformed (warped) as indicated by a right image 410. According to the present invention, image transformation is performed on one of the left image and the right image rather than both of the left image and the right image. Therefore, the present invention has lower complexity over the conventional technique in PTL 4, and thus has the advantageous effect of reducing processing time.

BRIEF DESCRIPTION OF DRAWINGS

Preferred features of the present invention will now be described by way of illustrative example with reference to the accompanying drawings. The drawings will be explained below.

FIG. 4a is a flow chart illustrating an operation of the image alignment module according to Embodiments 1 and 2 of the present invention.

FIG. 10a is an illustration of a stereoscopic display scenario with the positive parallax.

FIG. 10b is an illustration of a stereoscopic display scenario with the zero parallax.

FIG. 10c is an illustration of a stereoscopic display scenario with the negative parallax.

DESCRIPTION OF EMBODIMENTS

Figure 1:
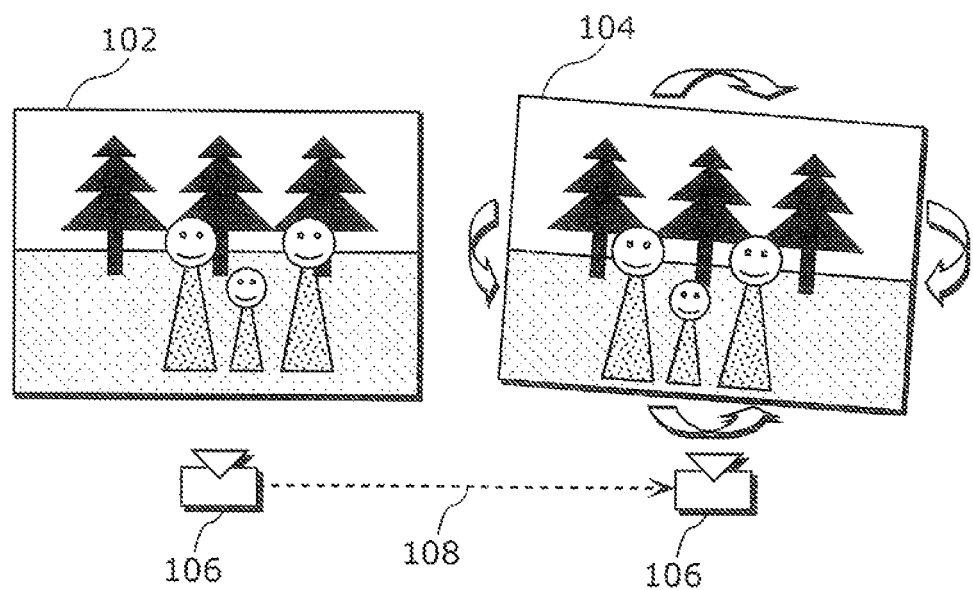
FIG. 1 is a diagram depicting the misalignment of a stereoscopic image pair captured using a handheld single image capturing device.

FIG. 1 shows an example for capturing an image pair using a single sensor capturing device; that is, an image capturing device that includes one lens and one image sensor. The left image 102 and the right image 104 are captured sequentially from different viewpoints using a single sensor digital camera 106. The camera moving distance between the left image 102 and the right image 104 is shown by a distance 108. It can be considered, in this example, that a user captures the left image 102 in a certain position and then moves his hand to the right by the distance 108 for capturing the right image 104.

In this example, the captured images (the left image 102 and the right image 104) are not aligned and contain the influence of translations and rotations due to camera movement (e.g. by hand). The distance 108 may be varied depending on the scene. For example, the distance 108 is shorter when the target object is closer and the distance 108 is larger when the target object is farther. The left image 102 and the right image 104 which are captured in the example can be appropriately aligned by the stereoscopic image aligning apparatus according to an embodiment of the present invention.

Figure 2:
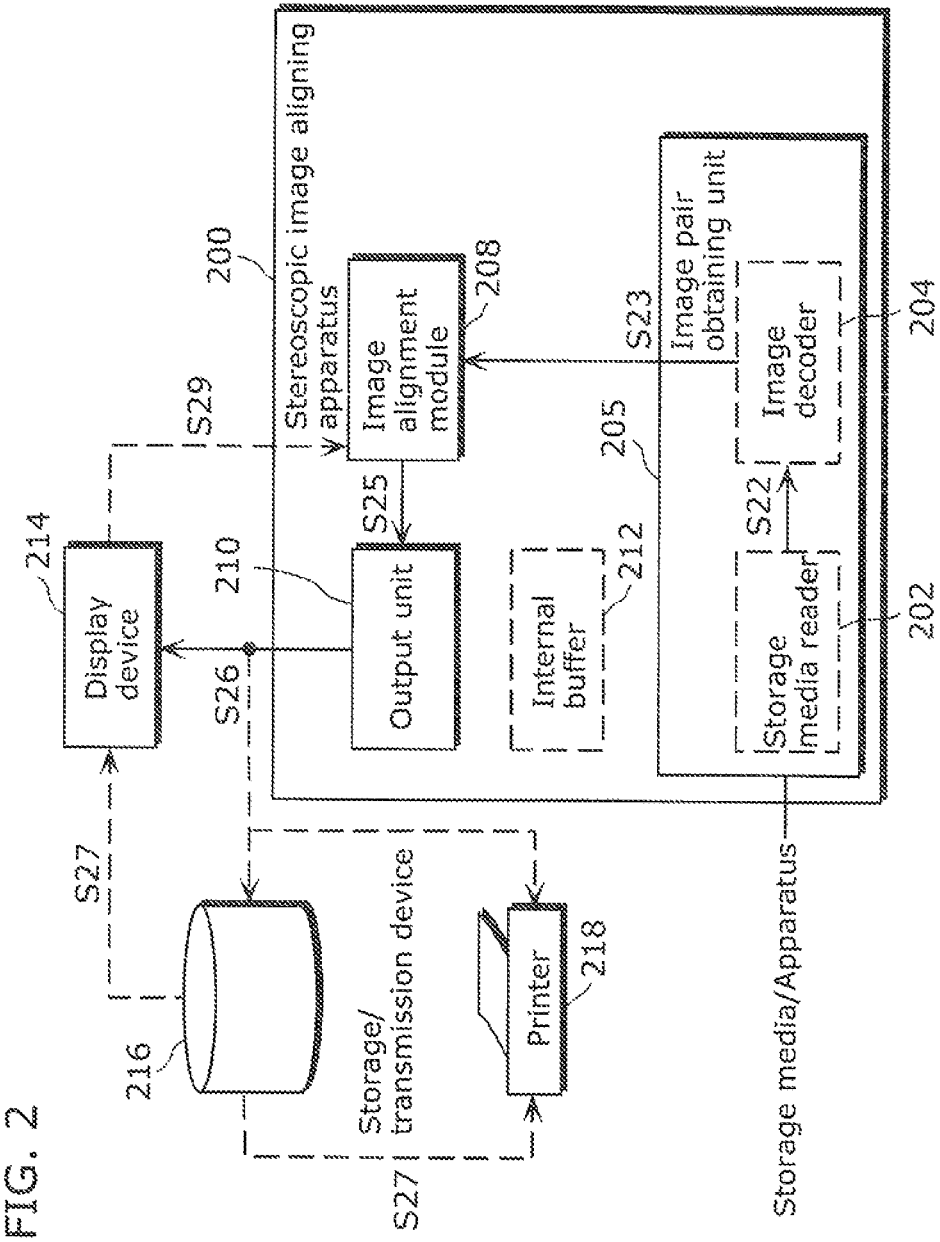
FIG. 2 is a block diagram illustrating an outline of a stereoscopic image aligning apparatus according to Embodiment 1 of the present invention.

FIG. 2 is a block diagram illustrating a stereoscopic image aligning apparatus 200 according to an embodiment of the present invention.

As shown in FIG. 2, the stereoscopic image aligning apparatus 200 according to the present embodiment includes: an image pair obtaining unit 205; an image alignment module 208; an output unit 210; and an internal buffer 212.

The image pair obtaining unit 205 obtains an image pair including a left-eye image and a right-eye image that corresponds to the left-eye image. The image pair obtaining unit 205 may obtain the image pair from a capturing device (not illustrated) that includes an image sensor and a lens, or may obtain the image pair through a storage media, a network, or the like.

Here, when the image pair obtaining unit 205 obtains the image pair from a capturing device, the image pair obtaining unit 205 may obtain, as the image pair, two images captured at the same time by a capturing device which includes one of (i) two image sensors and two lenses, (ii) one image sensor and two lenses, and (iii) two image sensors and one lens. Alternatively, the image pair obtaining unit 205 may obtain, as the image pair, two images captured at different times from different viewpoints using one image sensor and one lens.

The image pair obtaining unit 205 includes a storage media reader 202 and an image decoder 204. When image data that is an image pair is obtained from a storage media such as an SD memory card, for example, the storage media reader 202 obtains the image data from the storage media. When the image data S22 is encoded, the image decoder 204 decodes the image data, as necessary. It is to be noted that the image decoder 204 may decode coded data obtained through the network, for example. More specifically, the image pair obtaining unit 205 may decode an encoded image group in the cases where (i) the image group including a left-eye image and a right-eye image is encoded and stored in a memory card or (ii) the image group is encoded and transmitted through the network from an external device.

The image alignment module 208 performs image transformation to align the not-encoded image pair S23. Intermediate data associated with alignment processing is recorded in the internal buffer 212. The aligned image pair S25 is sent to the output wilt 210.

The output unit 210 outputs the image pair including the image transformed by the alignment. More specifically, the output unit 210 adjusts an output image format according to a preferable output type. For example, the output unit 210 may adjust the image format to match a display format displayable by the display device 214 so that the display device 214 can carry out display. Such formats may include a format for auto-stereoscopic device for viewing without glasses, gray/color anaglyph (viewing with glasses), interlaced format, checker-board format, and other formats for time-sequential stereoscopic display device viewed using active shutter glasses. Alternatively, the aligned image pair S26 may be stored/transmitted using a storage/transmission device 216. Examples of storage device include but are not limited to flash-based memory card, hard drives, and optical drives. Examples of transmission device include but are not limited to HDMI interface, USB interface, wireless interface and direct-to-printer interface. The storage or transmission device may optionally consist of lossless or lossy compression. The aligned image pair S26 can also be output for printing at a printer 218. The printer 218 may include a lenticular sheet for constructing the illusion of depth on a printed image. The stored image at storage/transmission device 216 may be directly sent to the printer 218, or sent to the display device 214 via a signal S27. A feedback signal S29 that can include display width may be fed back to the image alignment module 208, as necessary.

The image alignment module 208 and other internal modules included by the stereoscopic image aligning apparatus 200 are typically implemented in the form of IC (Integrated Circuits), ASIC (Application-Specific Integrated Circuits), LSI (Large Scale Integration), DSP (Digital Signal Processor), or implemented by any CPU based processor and machine including PC. Each of these modules can be in many single-function LSIs, or also can be in one integrated LSI. The name used here is LSI, but it may also be called IC, system LSI, super LSI, or ultra LSI in accordance with the degree of integration. Moreover, ways to achieve integration is not only LSI, but also special circuit or general purpose processor and so forth can achieve the integration. This includes a specialized microprocessor such as DSP (Digital Signal Processor) that can be directed by the program instruction. FPGA (Field Programmable Gate Array) that can be programmed after manufacturing LSI or reconfigurable processor that can re-configure the connection or configuration of LSI can be used for the same purpose. In the future, with advancement in manufacturing and process technology, a brand-new technology may replace LSI. The integration can be done by that technology. In the implementation, the stereoscopic image aligning apparatus 200 may be incorporated into a display device capable of displaying a stereoscopic image such as a liquid crystal display device or a plasma display device with time sequential image display, a display device with attached lenticular lens layer, or other types of display devices. The stereoscopic image aligning apparatus 200 may also be implemented in a digital media player device such as a digital video disc player, a Blu-ray® disc player, and other types of digital media player. The implementation of the stereoscopic image aligning apparatus 200 in other types of device is also possible and does not limit the scope of the present invention.

Figure 3:
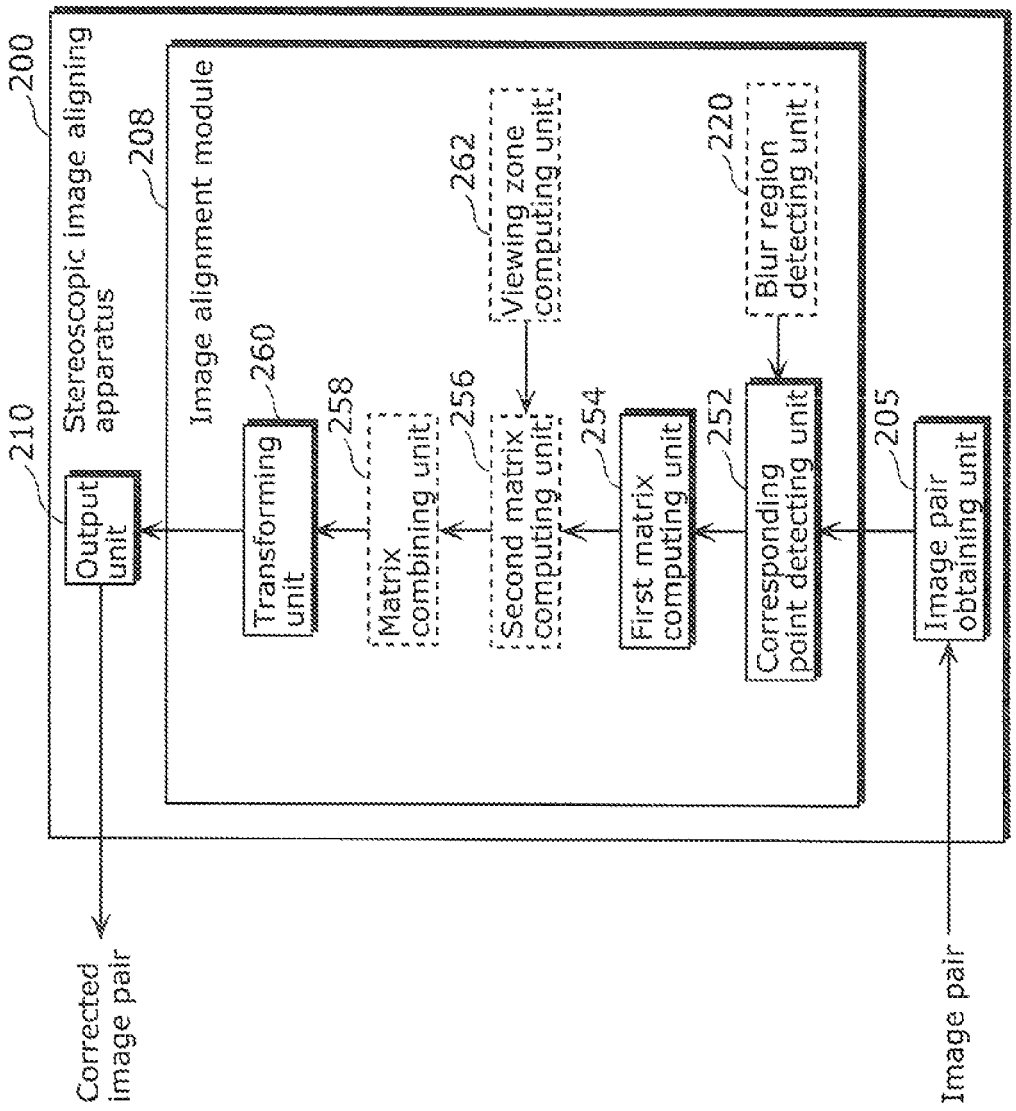
FIG. 3 is a block diagram illustrating a detailed functional configuration of an image alignment module according to Embodiments 1 and 2 of the present invention.

FIG. 3 is a block diagram illustrating a detailed functional configuration of the image alignment module 208 according to the present embodiment.

As shown in FIG. 3, the image alignment module 208 includes: a corresponding point detecting unit 252; a first matrix computing unit 254; a second matrix computing unit 256; a matrix combining unit 258; a transforming unit 260; a blur region detecting unit 220; and a viewing zone computing unit 262.

The corresponding point detecting unit 252 detects a corresponding point that represents a set of a first point and a second point. The first point is included in a first image that is one of the image pair obtained by the image pair obtaining unit 205. The second point is a point (i) included in a second image that is the other one of the image pair and (ii) corresponding to the first point.

The blur region detecting unit 220 detects a blur region in the image pair. The method of detecting a blur region can be optionally determined. For example, a blur region detecting method for identifying a block including a blur, by dividing an image into blocks and detecting, for each of the blocks, the rate of a portion in which a change in concentration of pixels aligned in the same direction may be used.

When a blur region is detected by the blur region detecting unit 220, it is preferable that the corresponding point detecting unit 252 detects a corresponding point from regions other than the region identified as the blur region in the image pair.

The first matrix computing unit 254 computes a homography transformation matrix for transforming the first point such that a vertical parallax between the first point and the second point is the smallest and an epipolar constraint is satisfied. It is to be noted that the vertical parallax is a difference in vertical position values. The details will be described later.

The second matrix computing unit 256 computes a skewing transformation matrix for transforming, again, a third image that is the first image transformed by the homography transformation matrix computed by the first matrix computing unit 254, such that a coordinate system of the third image has orthogonality and the third image has the same aspect ratio as the aspect ratio of the first image. The details will be described later.

The viewing zone computing unit 262 computes a viewing zone that is a region common to the first image and the second image. It is to be noted that, when the viewing zone is computed, it is preferable that the second matrix computing unit 256 computes the skewing transformation matrix such that a coordinate system of a portion in the viewing zone in the third image, instead of the entire portion of the third image, has the orthogonality and the same aspect ratio as an aspect ratio of a portion included in the viewing zone in the first image. The details will be described later.

The matrix combining unit 258 generates a combined transformation matrix by combining the homography transformation matrix and the skewing transformation matrix.

Finally, the transforming unit 260 transforms the first image using the combined transformation matrix.

The image pair including the third image and the second image which are transformed by the image alignment module 208 as described above is output as a corrected image pair from the output unit 210.

The configuration of the image alignment module 208 is described above with reference to FIG. 3.

The following describes in more detail the processing performed by each of the processing units included in the image alignment module 208.

FIG. 4a is a flow chart illustrating an operation performed by the image alignment module 208 according to the present embodiment. In Step S302, the image pair obtaining unit 205 obtains an image pair, thereby inputting the image pair to the stereoscopic image aligning apparatus 200. In Step S304, the corresponding point detecting unit 252 detects corresponding points of the image pair.

It is to be noted that, Step S304 can be skipped for speeding up the processing time if a sensor such as a Gyro sensor is used to derive the rotation amount between the two image capturing positions when the two images included in the image pair are captured. More specifically, the corresponding point detecting unit 252 computes a rotation parameter and a shift parameter used for generating the homography transformation matrix by the first matrix computing unit 254 so as to match an output from the Gyro sensor that outputs information corresponding to a rotation angle, thereby reducing the processing time for computing the matrix and improving accuracy.

In Step S306, the first matrix computing unit 254 computes a fundamental matrix (F matrix) using the corresponding points. In Step S308, the first matrix computing unit 254 computes a homography transformation matrix using the corresponding points. The purpose is to find a matrix which will transform one of the images such that the vertical parallax of the correspondent points becomes the smallest and the epipolar constraint is satisfied.

In Step S310, the second matrix computing unit 256 computes a skewing transformation matrix such that the viewing zone of the transformed image remains orthogonal and has the same aspect ratio as the viewing zone before the transformation. Viewing zone is the cropped region used for stereoscopic viewing, which contain regions common to both images. Only those corresponding points falling in the common region which is the overlapped region of the left and right images contribute to the computation of the skewing transformation matrix. When other regions are used, the final 3D image quality would not be guaranteed.

In Step S312, the matrix combining unit 258 combines the homography transformation matrix and the skewing transformation matrix. Next, in Step S314, one of the images in the image pair is transformed according to the combined transformation matrix (combined transformation matrix). Lastly, in Step S316, the aligned stereoscopic image pair is output from the output unit 210.

Figure 4B:
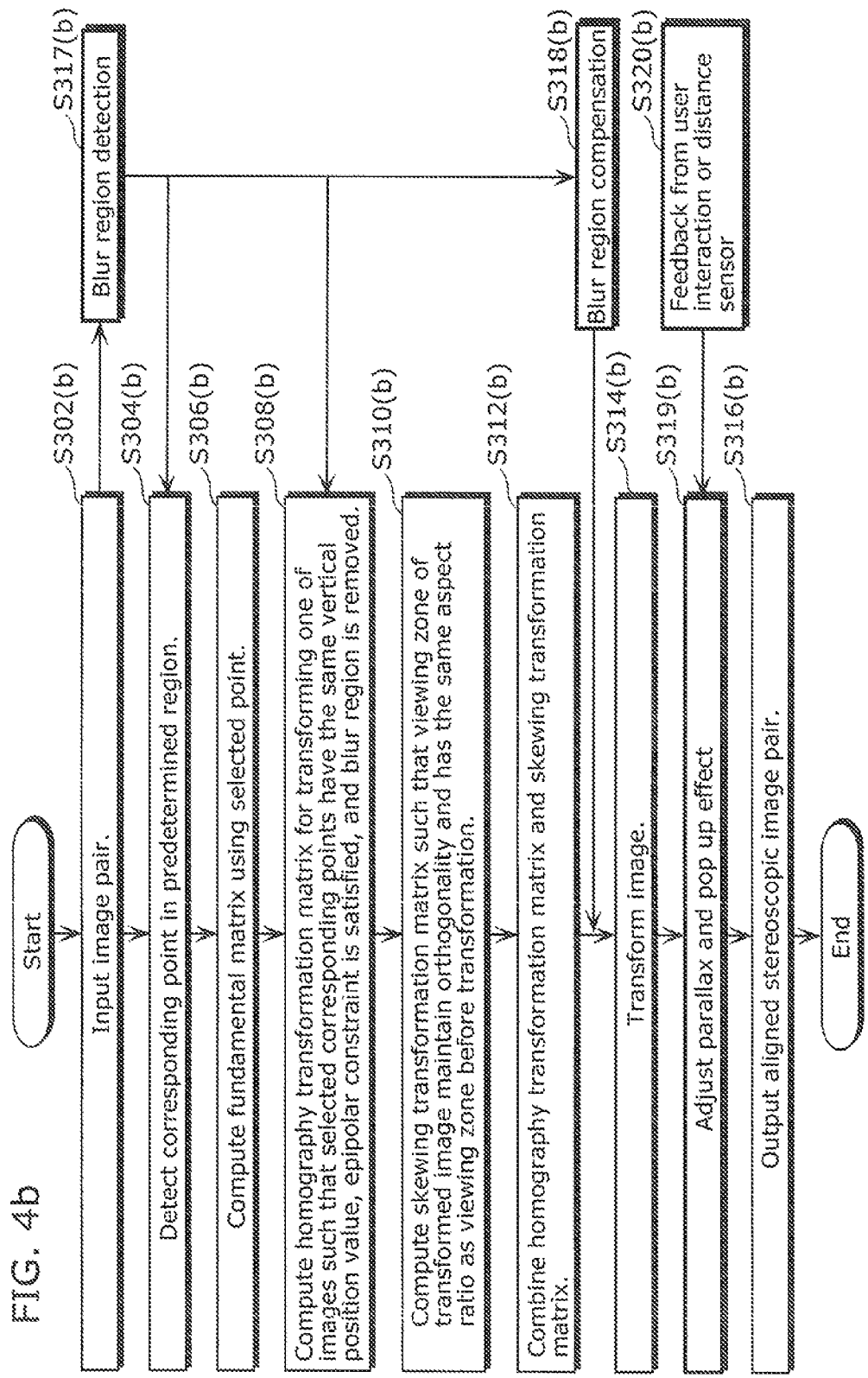
FIG. 4b is a flow chart illustrating an operation of the image alignment module with a blur region handling function according to Embodiments 1 and 2 of the present invention.
Figure 5A:
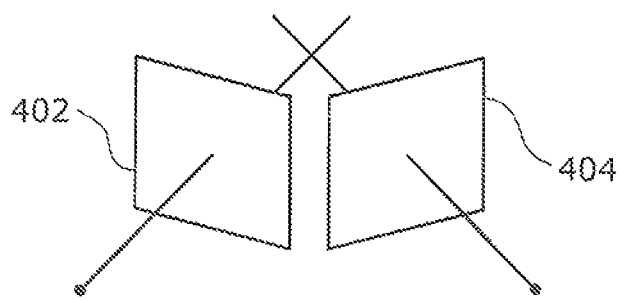
FIG. 5a is a diagram illustrating the orientation of a camera and images before alignment.
Figure 5B:
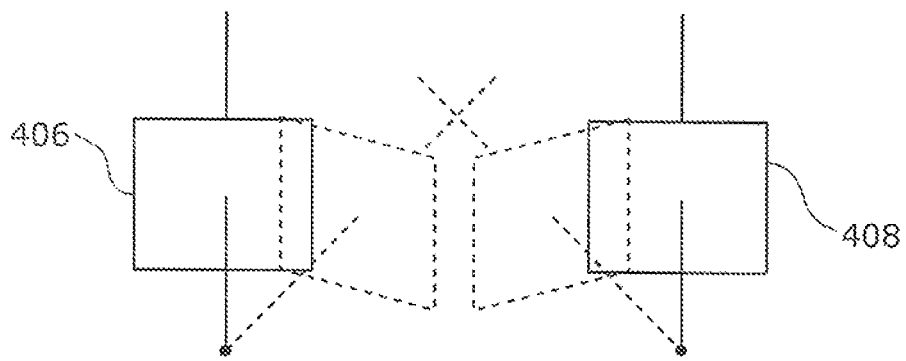
FIG. 5b is a diagram illustrating the orientation of the camera and the images after rectification by the conventional technique.
Figure 5C:
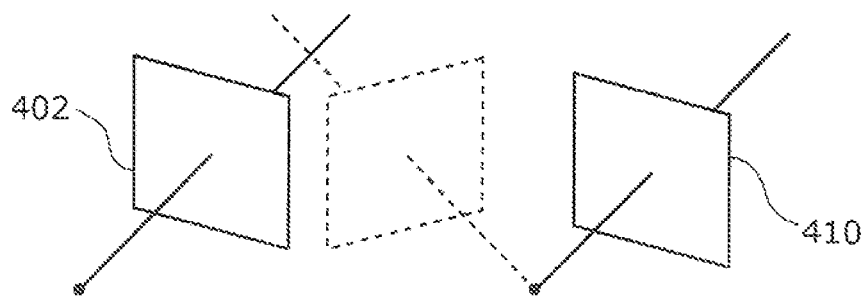
FIG. 5c is a diagram illustrating the orientation of the camera and images after alignment by the stereoscopic image aligning apparatus according to Embodiments 1 and 2 of the present invention

FIG. 4b shows another flow diagram which includes a blur region detecting step S317(b), a blur region compensation Step S318(b), a parallax adjusting step S319(b), and a user feedback Step S320(b).

Figure 12A:
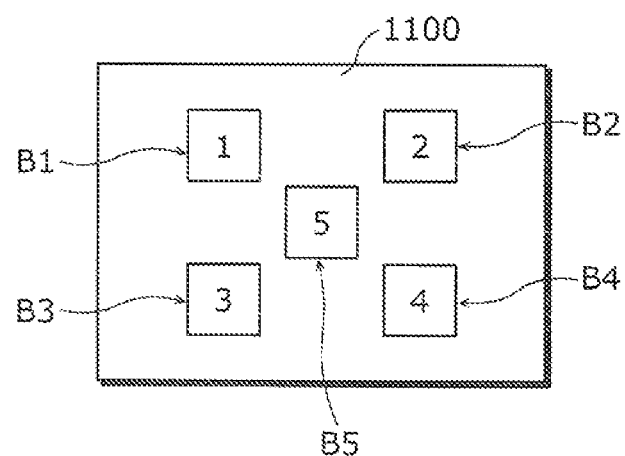
FIG. 12a is a first diagram illustrating an image region selection for extracting a feature point and generating a transformation matrix.
Figure 12B:
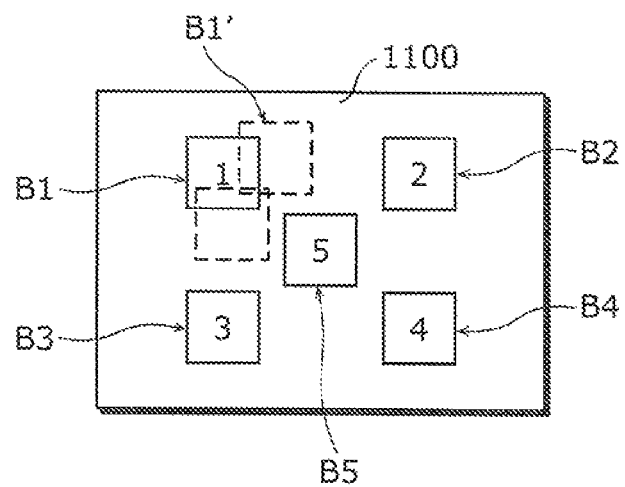
FIG. 12b is a second diagram illustrating the image region selection for extracting the feature point and generating the transformation matrix.

An image pair inputted in step S302(b) is then handled in S304(b) for detecting corresponding points. Here, only a certain region is targeted for detecting the corresponding points. To be specific, it is preferable to use a center region as a target region for detecting the corresponding points, in order to represent the common or overlapped region of the two images. In addition, a result of the blur region detecting in Step S317(b) may be used for excluding the blur region from the target region for detecting corresponding points. Only evenly distributed regions around the center may be selected as the target region for detecting corresponding points, for the purpose of complexity reduction or speeding up the feature points extraction. More specifically, the corresponding point detecting unit 252 may select small regions evenly distributed within a predetermined area extending from the center of each of the first image and the second image which are included in the image pair, and detect the corresponding points from the small regions. Each of FIG. 12a and FIG. 12b shows such a configuration, which will be described in the latter part of the present embodiment.

In Step S306(b), Step S308(b), and Step S310(b), the first matrix computing unit 254 and the second matrix computing unit 256 generate a warping matrix by excluding any points in the blur region, using only those selected candidate points.

In Step S318(b), the blur region or a blur object in one frame is compensated or shifted back by referring to the same blur region or blur object in another frame. Then, the resultant image will be subjected to warping in Step S314(b).

Figure 11:
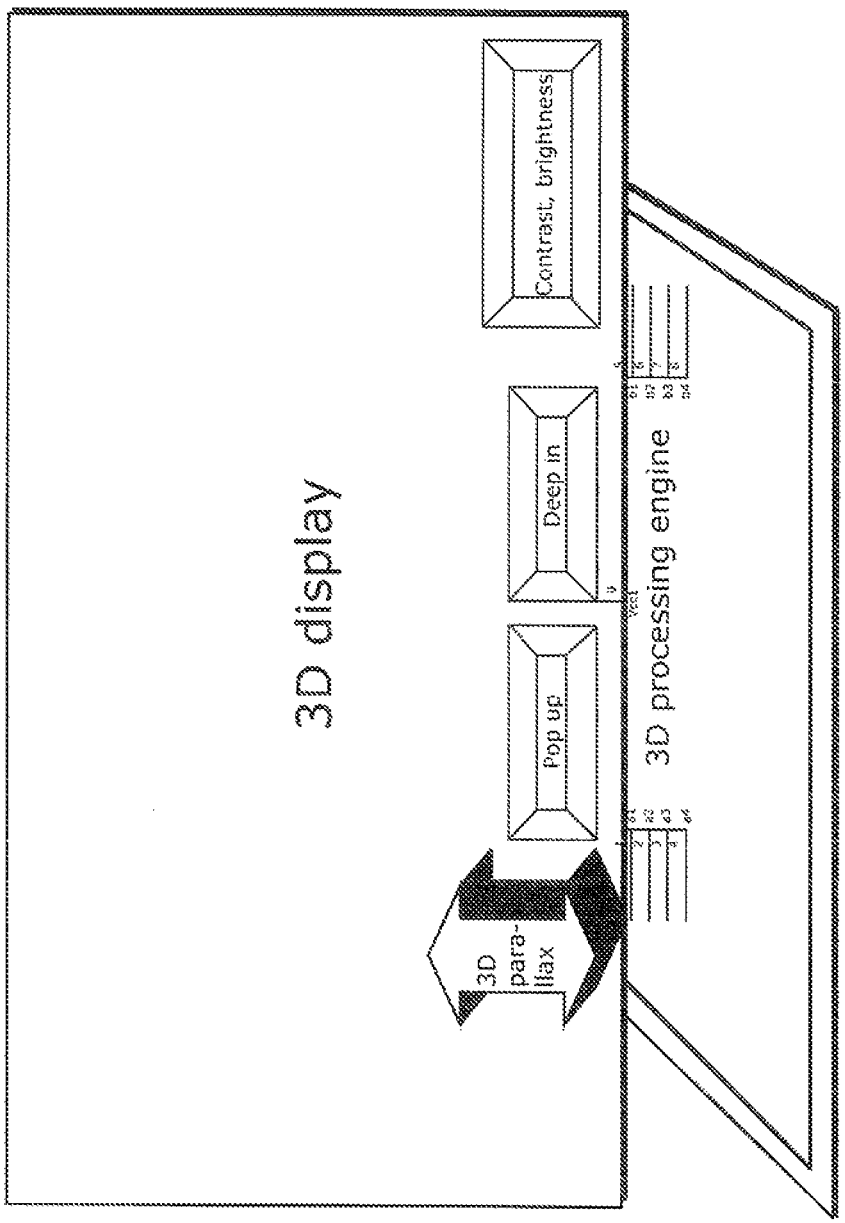
FIG. 11 is an illustration of user interaction through 3D Display buttons to communicate with 3D Processing Engine inside the 3D Display.

In Step S319(b), a parallax or a 3D effect such as a pop-up effect (effect in the direction that an image pops up) or deep-in effect (effect in the direction that an image sinks) can be adjusted by changing the baseline or other parameters, with the feedback from Step S320(b). As to the feedback, user interaction, for example by pressing a 3D display button (as shown in FIG. 11) is carried out to feedback to Step S319(b), or automatic detection of a viewing distance is carried out by a distance sensors or 2-camera system to feedback to Step S319(b). For example, the output unit 210 may perform and output image processing on an image pair such that the 3D effect decreases as the distance from a user is shorter.

In addition, in FIG. 11, user feedback can be carried out through pressing a 3D display button and a feedback signal will be sent to the 3D processing engine shown in FIG. 11. For example, "3D disparity" button is pressed up and down for more depth or less depth according to user's viewing distance and user eye's acceptance, or "pop-up" or "deep-in" is pressed to adjust the 3D effect of the content.

In addition, the output unit 210 may obtain information on the size of a display device and output after performing image processing on an is image pair such that the 3D effect is reduced as the display device is larger.

More specifically, the output unit 210 obtains adjustment information that indicates at least one of an input operation from the viewing user, the size of the display device, and the distance between the display device and the viewing user, and adjusts and outputs, based on the adjustment information, at least one of the parallax between the third image and the second image, the 3D pop-up effect, and the 3D deep-in effect.

It is to be noted that, when adjusting the 3D effect such as the 3D pop-up and the 3D deep-in effect, the output unit 210, specifically, adjusts the parallax between the left and right images included in the image pair. For example, with crossed parallax with which a right-eye image is, with respect to a left-eye image, placed on the left side of the left-eye image, the output unit 210 can strengthen the 3D pop-up effect by increasing the crossed disparity; that is, as the right-eye image is placed further leftward with respect to the left-eye image. In addition, with uncrossed parallax with which the right-eye image is, with respect to the left-eye image, placed on the right side of the left-eye image, it is possible to strengthen the 3D deep-in effect by increasing the uncrossed disparity; that is, as the right-eye image is placed further rightward with respect to the left-eye image.

It is to be noted that the corresponding point detecting unit 252 may divide an image 1100 into five sub-blocks; that is, B1, B2, B3, B4, and B5, as shown in FIG. 12a. These blocks (or some of the blocks) may be used for features detection, descriptors calculation, and correspondence point determination. In this case, the processing for whole image is not required. This accelerates the computation time of the system. Furthermore, these blocks could help to improve the accuracy of the transformation matrix and speed up the desirable correspondences selection. In addition, in the case of homogenous block, there are usually no useful features. Thus, a homogenous block should be omitted. Considering block B1 in FIG. 12(b), when B1 is a homogenous block, non-homogenous block around B1 will be selected (for example B1' when it is non-homogenous block). This is to make sure that all the selected blocks contain useful features. Other schemes for image region selection may be used based on the above premise.

Here, when a block is homogenous, it means that variation of image information included in the block is small. For example, when (i) the number of pixels whose pixel values differ, to the extent equal to or more than a predetermined threshold, from pixel values of adjacent pixels in a block (so-called an edge portion) is smaller than a predetermined threshold or (ii) a median value or an average value of a spatial frequency is smaller than a predetermined threshold, the block may be determined as homogenous and other blocks may be determined as non-homogenous.

The conventional methods can arbitrarily be used for the correspondent point detecting method performed by the corresponding point detecting unit 252. For example, each of the images in an image pair is divided into predetermined blocks having the same size and an edge pair included in each of the blocks is extracted. Then, the degree of similarity (for example, least sum of squares, likelihood, AIC, and the like) is computed for each of the edges and a point included in the edge that has the highest degree of similarity is detected as a correspond point, for example. More specifically, examples of known methods are disclosed by D. Lowe in "Object recognition from local scale-invariant features" in "International Conference on Computer Vision" (1999) (NPL 1) and by H. Bay et al in "SURF: Speeded up robust features" in "European Conference on Computer Vision" (2006) (NPL 2). Other methods of correspondent points detection may be used for the corresponding point detecting unit 252 and it does not affect the scope and spirit of the present invention.

Next, in Step S306, the first matrix computing unit 254 computes a fundamental matrix F using the detected corresponding points. The following simply describes how to obtain the fundamental matrix F.

The fundamental matrix F is a 3×3 rank-2 matrix that transforms a point included in the first image into an epipolar line included in the second image. More specifically, Fr that is a result of transforming a point r included in the first image by the fundamental matrix F becomes the epipolar line in the second image. As is clear from the above, the fundamental matrix F has the characteristics of $l^T Fr=0$. It is to be noted that l is a corresponding point of r in the second image.

It is assumed here that l, F, and r are represented by Expression 1 below.

[Math. 1]

$$l = \begin{bmatrix} l_x \\ l_y \\ 1 \end{bmatrix}$$

$$F = \begin{bmatrix} f_{11} & f_{12} & f_{13} \\ f_{21} & f_{22} & f_{23} \\ f_{31} & f_{32} & f_{33} \end{bmatrix}$$

$$r = \begin{bmatrix} r_x \\ r_y \\ 1 \end{bmatrix}$$

Expression 1

Furthermore, when a vector $u=(f_{11}, f_{12}, f_{13}, f_{21}, f_{22}, f_{23}, f_{31}, f_{32}, f_{33})^T$ and a vector $\xi=(l_x r_x, l_x r_y, l_x, l_y r_x, l_y r_y, l_y, r_x, r_y, 1)^T$, $u \cdot \xi = 0$ is derived from $l^T Fr=0$.

Accordingly, the ninth vector u is estimated under the constrained condition that an inner product is zero, using the ninth vector data $\{\xi_o\}$ generated by the corresponding points (these corresponding points include errors in practice) detected by the corresponding point detecting unit 252. There are various solutions for this. For example, the fundamental matrix F can be obtained using the maximum likelihood estimation method, with which u is determined with numerical computation such that the likelihood is the maximum. More specifically, the fundamental matrix can be obtained with various methods such as R. Hartley and A. Zisserman, Multiple View Geometry in Computer Vision, Cambridge University Press, London, 2000 (NPL 3); X. Armangué and J. Salvi, "Overall view regarding fundamental matrix estimation," Image and Vision Computing, Vol. 21, 2003, pp. 205-220 (NPL 4); and Z. Zhang, "Determining the epipolar geometry and its uncertainty: a review," International Journal of Computer Vision, Vol. 27, 1998, pp. 161-198 (NPL 4).

The details for homography transformation matrix computation in Step S308 are disclosed here. The second matrix computing unit 256 computes the homography transformation matrix for warping one of the images in the image pair. Either of the images can be chosen. In this embodiment, the right-eye image is chosen to be warped. However, it does not affect the scope or spirit of the invention if the left-eye image is chosen. There may be an adaptive algorithm to select a left-eye image or a right-eye image for warping based on certain criteria. The criteria is, for example, which one of the left-eye image and the right-eye image is more horizontal, which one of the left-eye image and the right-eye image is sharper, or which one of the left-eye image and the right-eye image contains the object of interest, and so on.

The present invention uses the epipolar geometry compatible homography transformation, or in other words, homography which is consistent or compatible with the fundamental matrix (see NPL 3). This limits the degree of freedom to 3 instead of 8 for the normal homography transformation. The equation is represented by Expression 2 below.

[Math. 2]

$$H = A - e' v^T$$

$$A = [e']_x F$$

Expression 2

In Expression 2, H is the 3×3 homography transformation matrix (so-called homography) to transform the right image. More specifically, it is a matrix to transform a coordinate of r such that l=Hr is satisfied where a point included in the first image is r and a point included in the second image is l.

Furthermore, F is the 3×3 fundamental matrix F computed in Step S306.

Furthermore, e' is the 3×1 homogeneous coordinate of the epipole of the right image. It can be derived from the fundamental matrix F. To be more specific, the epipole e' has a characteristic of $F^T e'=0$ by the fundamental matrix F, and thus the epipole e' is obtained as an eigenvector that corresponds to the minimum eigenvalue of the matrix $FF^T$.

In addition, [a]×b is cross product and means a×b.

In addition, $V^T$ is the 1×3 vector containing the parameters of 3 degrees of freedom.

The first matrix computing unit 254 according to the present invention finds H that is parameterized by $V^T$ such that the vertical parallax between the correspondent points is minimized. To be more specific, v that satisfies Expression 3 is computed. It is assumed here that $X_L$ is the list of corresponding points in the left image and $X_R$ is the list of corresponding points in the right image. Expression 3 is shown below.

[Math. 3]

$$\min\{|y\_component\_of(X_L) - y\_component\_of(H \times X_R)|\}$$

Expression 3

Here, y_component_of (X) represents a vertical coordinate component of the point X.

Therefore, the first matrix computing unit 254 can determine the parameter $V^T$ with numerical computation, using corresponding points ($X_L$ and $X_R$). For example, the least square method can be used for determining v that minimizes Expression 3. Another method to find H is to solve for H for each pair of correspondent points and then take the average.

Next, the details for computing a skewing transformation matrix in step S310 are disclosed here. The homography transformation matrix computed in Step S308 does not constrain the parallax in the x direction. Therefore, since the image transformed through the homography transformation using H can be skewed in some cases and thus there is a need to correct the skew of the image by performing a skewing transformation. To compute the amount of skew, the aspect ratio and the orthogonality of the viewing zone are restored according to an implementation of the present invention. The terms "viewing zone", "aspect ratio", and "orthogonality" are explained using FIG. 6a and FIG. 6b.

Figure 6A:
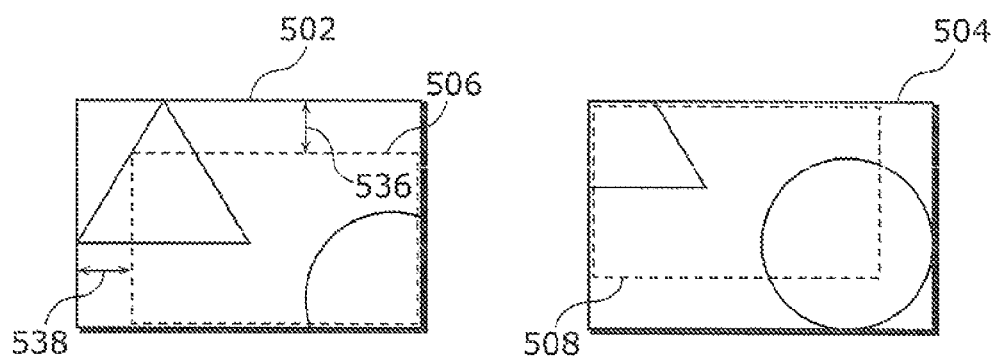
FIG. 6a is a diagram illustrating the concept of viewing zone or overlapped region from an image pair.
Figure 6B:
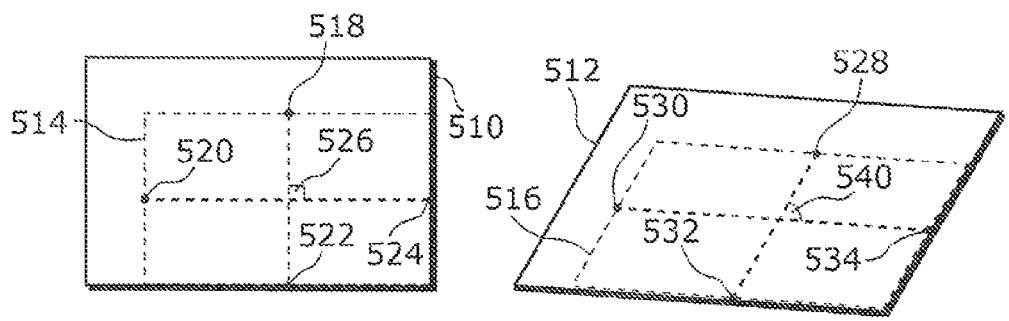
FIG. 6b is a diagram illustrating the concept of orthogonality and aspect ratio of the viewing zone or overlapped region before and after warping by homography transformation matrix.

FIG. 6a depicts a left-eye image 502 and a right-eye image 504. The inner rectangles 506 and 508 outline the region common to the both images. Regions outside the inner rectangles 506 and 508 appear in only one of the images. For stereoscopic viewing, these regions are not comfortable because the regions are seen by only one of the eyes and the human brain cannot extract parallax information for allowing a perception of depth. The inner rectangles 506 and 508 are termed the viewing zones. FIG. 6b depicts a pre-transformation image 510, and a post-transformation image 512 for one of the left and right images. A pre-transformation viewing zone 514 has a certain aspect ratio which may be defined by the ratio of the distance between points 518 and 522 to the distance between points 520 and 524. The angle 526 is also orthogonal. A post-transformation viewing zone 516 may have different aspect ratio similarly defined by the warped points 528, 530, 532, and 534. The angle 540 does not have to be orthogonal. The shearing transformation matrix is computed to restore the orthogonality and the aspect ratio.

The following describes in more detail the method of computing the shearing transformation matrix that is the skewing transformation matrix computed by the second matrix computing unit 256.

Expression 4 shows a general form of the shearing transformation matrix.

[Math. 4]

$$S = \begin{bmatrix} s1 & s2 & 0 \\ 0 & 1 & 0 \\ 0 & 0 & 1 \end{bmatrix}$$ Expression 4

Figure 13:
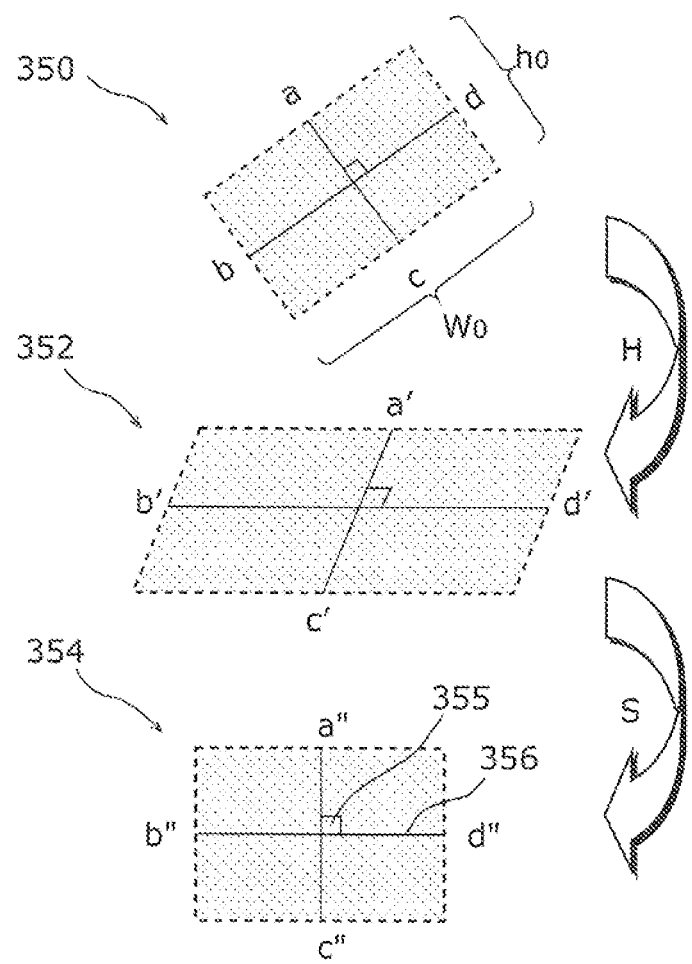
FIG. 13 is a diagram explaining an example of the method of computing a skewing transformation matrix according to Embodiments 1 and 2 of the present invention.

With reference to FIG. 13, the matrix S represented by Expression 4 is a matrix for obtaining a right-eye image 354 in which coordinate axes are orthogonalized by restoring a right-eye image 352 that is a result of transforming a right-eye image 350 by the matrix H computed by the first matrix computing unit 254.

It is to be noted here that, the points corresponding in the right-eye image 350, the right-eye image 352, and the right-eye image 354 are as below. That is, a point a in the right-eye image 350 corresponds to a point a' in the right-eye image 352, and a point a' corresponds to a point a" in the right-eye image 354.

In the same manner as above, b, b', and b" correspond to one another, c, c', and c" correspond to one another, and d, d', and d" correspond to one another.

Furthermore, the following are defined: a'=Ha; b'=Hb; c'=Hc; d'=Hd; a"=SHa; b"=SHb; c"=SHc; and d"=SHd.

In addition, as described above, a line segment a"c" 355 and a line segment c"d" 356 in the image 354 are orthogonalized. Furthermore, since the aspect ratio of the right-eye image 354 matches the aspect ratio of the right-eye image 352, the ratio of the length of the line segment a"c" 355 to the length of the line segment b"d" 356 matches the ratio of the length $h_0$ of a line segment ac to the length $w_0$ of a line segment bd.

As described above, the second matrix computing unit 256 computes variables s1 and s2 included in the skewing transformation matrix S such that both of two constrained conditions indicated in Expression 5, below are satisfied.

[Math. 5]

$$\begin{cases} a''c'' \perp b''d'' \\ \dfrac{\|a'' - c''\|^2}{\|b'' - d''\|^2} = \dfrac{h_o^2}{w_o^2} = \dfrac{\|a - c\|^2}{\|b - d\|^2} \end{cases}$$ Expression 5

Next, one method of computing the viewing zone will be described. First, the centroid of the corresponding points in the left-eye image is computed. Next, the corresponding points in the right-eye image are transformed and the centroid of the transformed corresponding points is computed. As a result, the difference between the centroids is computed. A value in the vertical direction of the difference between the centriods corresponds to a vertical difference 536 in FIG. 6a. In addition, a value in the horizontal direction of the difference between the centriods corresponds to a horizontal difference 538 in FIG. 6a. Thus the dimension of the viewing zone can be derived from the original image size and the difference in centroid. This method may not give the perfect viewing zone, i.e. there may be some difference in the computed viewing zone and the actual viewing zone. But it is sufficient to produce satisfactory results.

The homography transformation matrix and shearing transformation matrix are computed using the correspondent points. The image itself has not been warped. It is preferred to combine the homography transformation matrix and shearing transformation matrix before applying one transformation operation rather than two separate transformation operations.

The effects of processes in Step S308 to Step S314 described above will be again described with reference to FIG. 14.

Figure 14:
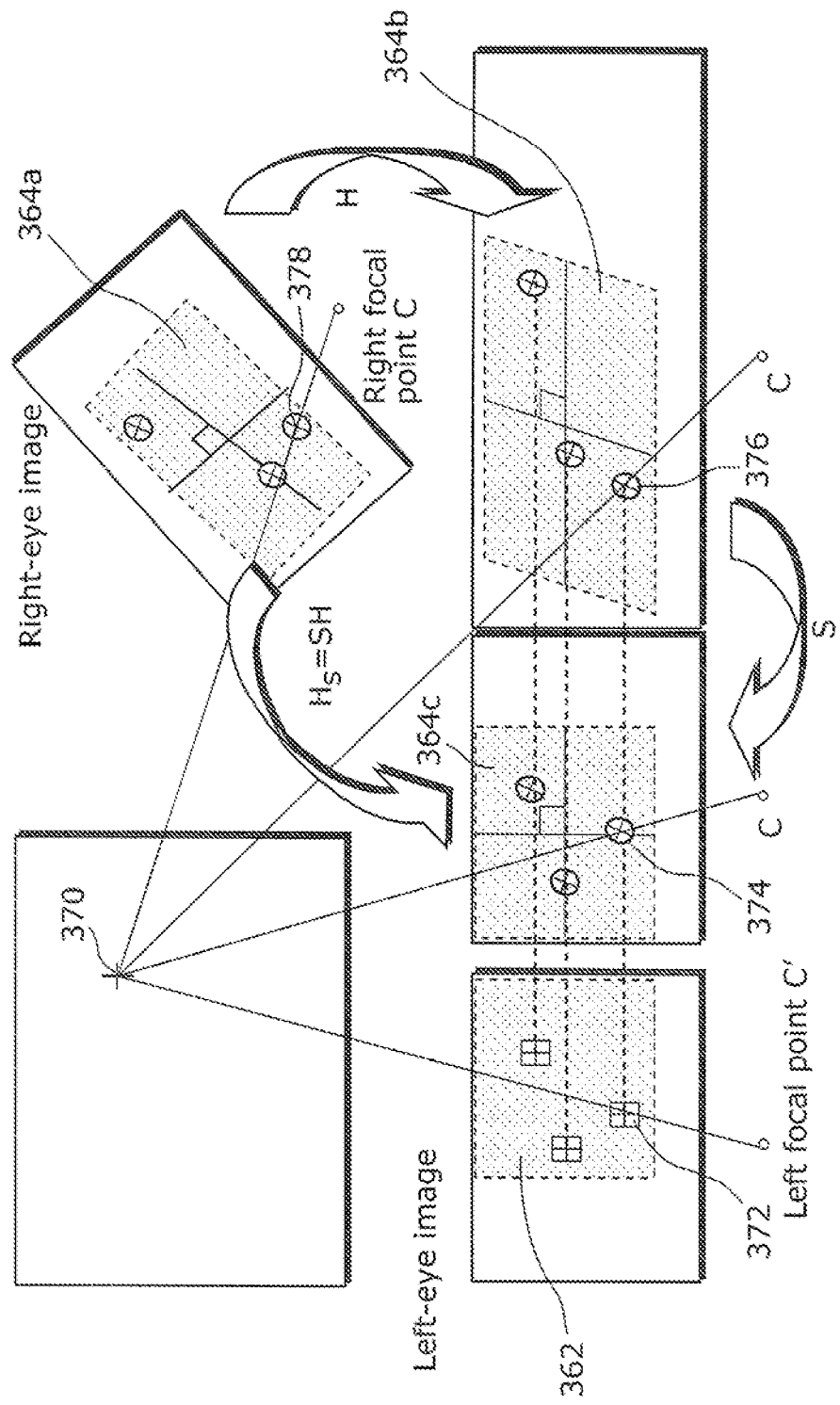
FIG. 14 is a conceptual diagram illustrating an image of image conversion processing by a homography transformation matrix and a skewing transformation matrix according to Embodiments 1 and 1 of the present invention.

FIG. 14 is a conceptual diagram illustrating an image of image conversion processing using the homography transformation matrix H and the skewing transformation matrix S.

It is assumed that, among the images shown in FIG. 14, a viewing zone 362 included in the left-eye image plane and a viewing zone 364a included in the right-eye image plane are the viewing zones of the left and right images included in the image pair obtained by the image pair obtaining unit 205 according to the present embodiment. It is to be noted that a point 372 included in the viewing zone 362 and a point 378 included in the viewing zone 364a are points imaged on the left-eye image plane and the right-eye image plane when a point 370 is viewed from a left focal point c' and a right focal point c, respectively. Thus, the point 372 and the point 378 are corresponding points.

Here, the vertical positions of the point 372 and the point 378 are significantly different. Likewise, the vertical positions of other corresponding points are significantly different.

The viewing zone 364b is an image obtained by transforming the viewing zone 364a using the homography transformation matrix H. With this transforming, the vertical positions of the corresponding point of the viewing zone 362 and the viewing zone 364b matches. For example, the vertical positions of the point 372 and the point 378 that is the corresponding point of the point 372 are the same.

However, when the viewing zone 362 and the viewing zone 364b are compared as shown in FIG. 14, the coordinate axes are not orthogonalized but skewed.

An image obtained by transforming the viewing zone 364b using the skewing transformation matrix S is the viewing zone 364c. The corresponding points of the viewing zone 364c and the viewing zone 362 (the point 372 and the point 374) have the same vertical position and the orthogonality of the coordinates in the viewing zone is maintained.

In addition, it is possible to transform directly from the viewing zone 364a to the viewing zone 364c by computing a matrix $H_S$(=SH) which is the result of combining the matrix H and the matrix S.

As to a correspondence with FIG. 3, the first matrix computing unit 254 computes the homography transformation matrix H. The second matrix computing unit 256 computes the skewing transformation matrix S. The matrix combining unit 258 computes the matrix $H_S$. The transforming unit 260 performs transforming using the matrix $H_S$ on the viewing zone included in one of the images of the obtained image pair (for example, the viewing zone 364a).

Figure 7:
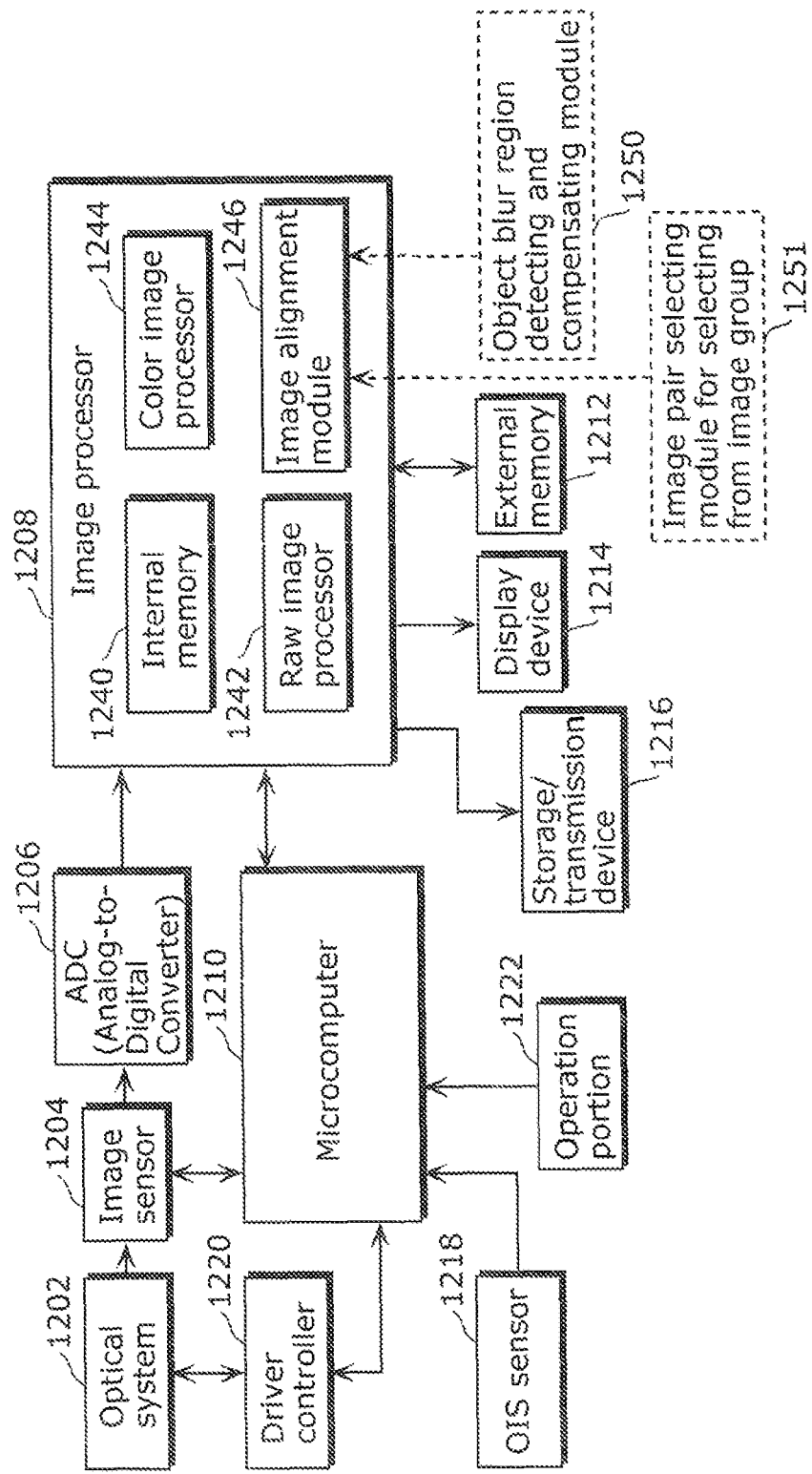
FIG. 7 is a block diagram illustrating an image capturing device according to Embodiment 2 of the present invention.

The following describes Embodiment 2 according to the present invention, with reference to FIG. 7. In Embodiment 2, the image alignment module 208 is included in a capturing device. It is to be noted that an image alignment module 1246 has the same configuration as the configuration of the stereoscopic image aligning apparatus 200

FIG. 7 is a schematic block diagram of a capturing device 1200 according to another embodiment of the present invention. The capturing device 1200 includes an optical system 1202, an image sensor 1204, an ADC (Analog-to-Digital Converter) 1206, an image processor 1208, a microcomputer 1210, an external memory 1212, a driver controller 1220, an OIS (Optical Image Stabilizer) sensor 1218, an operation portion 1222, a storage/transmission device 1216, and a display device 1214. The image processor 1208 includes an internal memory 1240, an image alignment module 1246, a raw image processor 1242, and a color image processor 1244. Other components such as a microphone and a speaker are not shown, but this does not limit the scope and spirit of the present invention.

The optical system 1202 may include components such as lenses or a set of lens, zoom/focus mechanisms, actuators, shutters, and apertures for controlling the light signal reaching the image sensor 1204. The image sensor 1204 accumulates an incoming light signal and converts the light signal into an electrical signal in response to the control of the microcomputer 1210. The electrical signal is converted into digital data (raw image data) by the ADC 1206 and stored in the internal memory 1240 or the external memory 1212. The raw image data may contain a stereoscopic image pair obtained by capturing the left and right images sequentially from different viewpoints. The raw image processor 1242 may obtain the raw image data from the internal memory 1240 (or the external memory 1212) and may perform many pre-processing (not shown), such as noise reduction, linearity correction, white balance, and gamma correction, and output the pre-processed raw image. This pre-processed raw image can be stored or transmitted by the storage/transmission device 1216. The pre-processed raw image can also be processed by the color image processor 1244 to generate a color image, such as RGB or YCbCr. The color image processor 1244 may include color interpolation, color correction, tonal rage adjustment, color noise reduction, and etc, for generating preferred color image. The image alignment module 1246 takes in the color images of the stereoscopic image pair and aligns the color images. The aligned stereoscopic image pair that is output can be displayed by the display device 1214, such as a liquid crystal monitor with attached lenticular lens layer capable of displaying a stereoscopic image for 3D viewing. The images can also displayed in 2D. The aligned stereoscopic image pair that is output can also be stored in the storage/transmission device. The pre-processed raw images and the output images may be compressed by a compression unit (not shown) before storing/transmitting by the storage/transmission device 1216. Examples of storage device include but are not limited to flash-based memory card, hard drives, and optical drives. Examples of transmission device include but are not limited to HDMI interface, USB interface, wireless interface and direct-to-printer interface. The storage or transmission device may optionally consist of lossless or lossy compression.

The optical system 1202 may be controlled by the driver controller 1220. The driver controller 1220 is controlled by the microcomputer 1210. The operation portion 1222 receives a user operation input and sends the electrical signal to the microprocessor 1210 to control the related modules, such as the driver controller 1220, the image sensor 1204, the image processor 1208, corresponding to the user input. The OIS sensor 1218 detects the motion due to hand shaking or camera motion and sends the electrical signal to the microcomputer 1210. The microcomputer 1210 controls the driver controller 1220 to control actuators or the like in the optical system 1202 for moving the lenses so as to compensate for the motion, thus reducing blur effect caused by hand shaking or camera motion.

The description of the previous embodiments can be referred to for the details of the image alignment module 1246. Before the processes performed by the image alignment module 1246, processes performed by an image pair selecting module 1251 may be performed so as to produce a better 3D effect with comfortable viewing under certain criteria.

In the case where the images are captured in different times, it is preferable, when viewing the images in 3D, to remove motion blur of an object by applying an object blur region detecting and compensating module 1250.

The image processor 1208, the image alignment module 1246, and the modules within are typically achieved in the form of IC (Integrated Circuits), ASIC (Application-Specific Integrated Circuits), or LSI (Large Scale Integrated) circuits. Each of these modules can be in plural single-function LSIs, or also can be in one integrated LSI. The name used here is LSI, but it may also be called IC, system LSI, super LSI, or ultra LSI in accordance with the degree of integration. Moreover, ways to achieve integration is not only LSI, but special circuit or general purpose processor and so forth can also achieve the integration. This includes a specialized microprocessor such as DSP (Digital Signal Processor) that can be directed by the program instruction. FPGA (Field Programmable Gate Array) that can be programmed after manufacturing LSI or reconfigurable processor that can re-configure the connection or configuration of LSI can be used for the same purpose. In the future, with advancement in manufacturing and process technology, a brand-new technology may replace LSI. The integration can be done by that technology.

Figure 8:
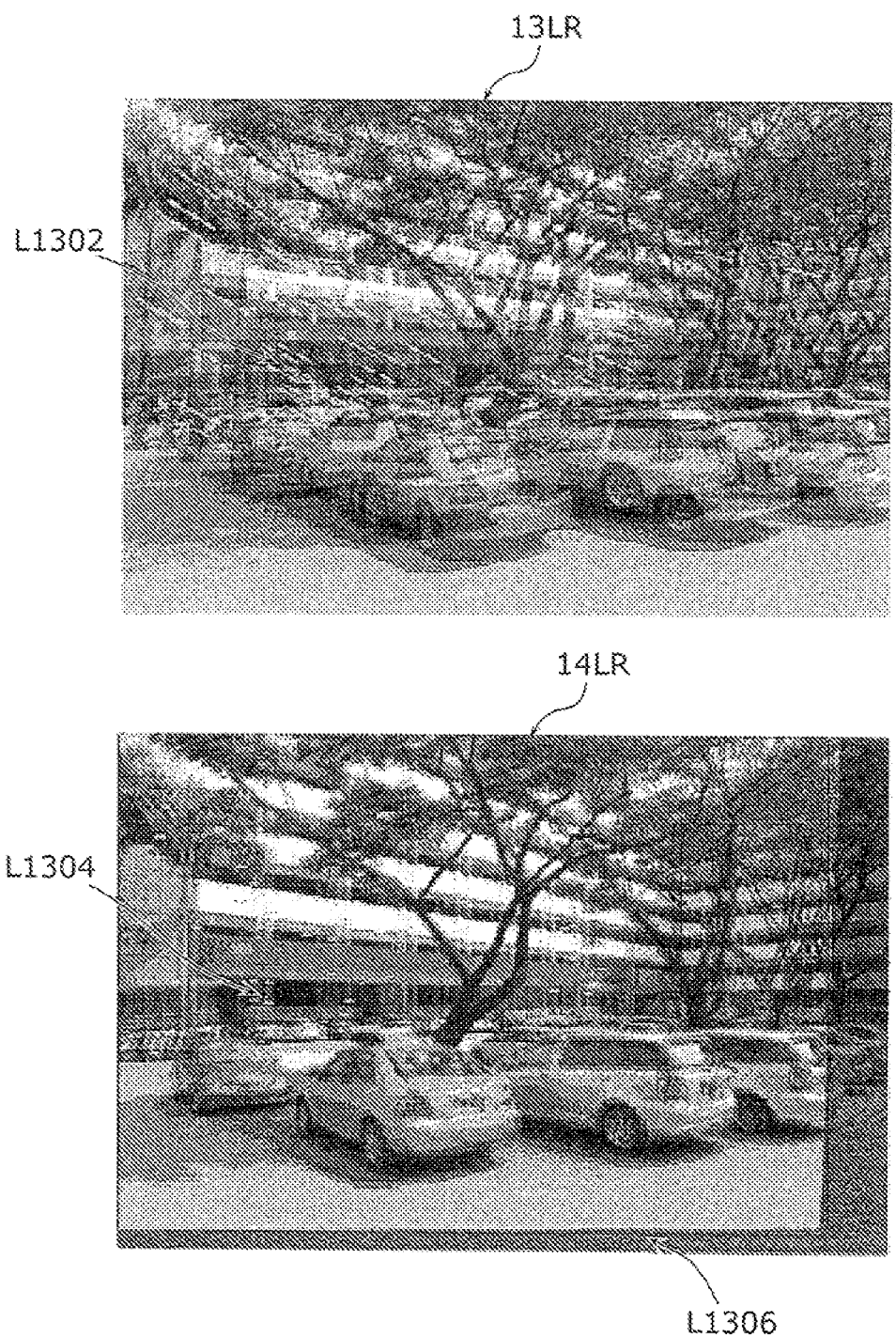
FIG. 8 is one result illustrating the effectiveness of the stereoscopic image aligning apparatus and the like according to Embodiments 1 and 2 of the present invention.

FIG. 8 is an example of resulting images showing the effect of the stereoscopic image aligning apparatus 200 according to Embodiment 1 of the present invention. The resulting image 13LR shows an overlay image between a left-eye image and a right-eye image of a stereoscopic image pair before image alignment. Furthermore, a difference lines (e.g. L1302) indicating the correspondences (misalignment) between the images are superimposed and indicated on the overlay image. It can be seen, from the resulting image 13LR, that the difference lines extend both in the vertical direction and the horizontal direction due to hand movement and are not aligned. When the stereoscopic image pair of the resulting image 13LR is displayed for 3D viewing, the displayed image can cause eyestrain and visual discomfort to an observer.

The resulting image 14LR shows an overlay image between left image and the right image of a stereoscopic image pair after image alignment according to an implementation of the present invention. It can be seen, from the resulting image 14LR that the difference lines (L1304) are well aligned (the image pair is well aligned). In addition, the line L1306 indicates a cropping region. This aligned stereoscopic image pair can produce very comfortable 3D viewing when the image pair is displayed. Therefore, the effectiveness of the present invention is verified by FIG. 8.

It is to be noted that the stereoscopic image aligning apparatus 200 according to Embodiment 1 may be used for an image capturing apparatus operating in multi-shot mode. In such mode, multiple images are automatically captured when the user press a button. When the user moves the camera during multi-shot capturing, images of the same scene at different view points are captured. An image pair can be selected from the plurality of images. Criteria for selection can be based on the correspondent points. It is preferred to select an image pair with a sufficient number of correspondent points to input to the image alignment module. Method to detect correspondent points is disclosed in Embodiment 1 as described above. The time interval between each capture can be set by a timer. Each capture can also be triggered by motion of the apparatus. Gyro sensors or accelerometers can be used to determine such movement. It is preferred to trigger the capture when the capturing apparatus has moved a predetermined distance such that disparity is sufficient for stereoscopic viewing.

In addition, objects are at different depths in a scene, in some cases. If the object is nearer, the distance for moving the apparatus should be smaller, and if the object is further, the distance for moving the apparatus should be larger. This distance can be adaptively computed based on the depth of the object. One method to determine the depth is by the focus.

In addition, the stereoscopic image aligning apparatus 200 according to Embodiment 1 can be used in a video capturing apparatus with which the current image is paired with one of the neighboring images to form an image pair. Thus stereoscopic video can be produced from a normal 2D video.

Figure 9:
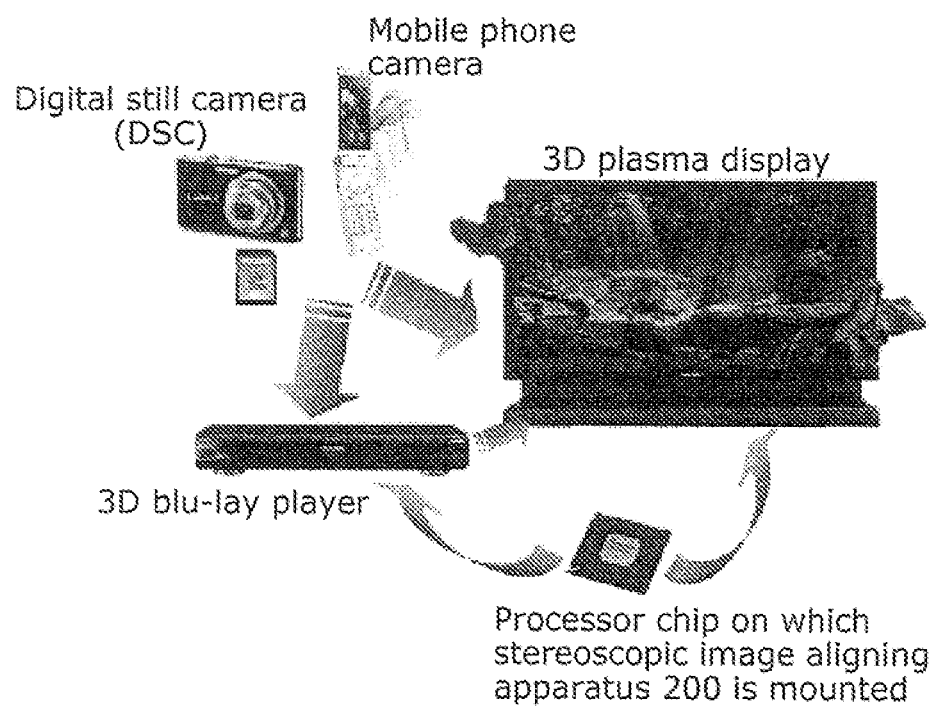
FIG. 9 is an application example in which the present invention is used as a 3D Processing Engine.

In FIG. 9, the application possibility is shown. A normal camera or a mobile phone is used to capture more than two images and stored in an SD card or other memory card. The 3D image alignment can be conducted inside the camera or the mobile phone. The 3D image alignment can also be conducted in any player or display device by embedding the 3D image alignment module 208 in the Hardware of the player or the display. It is also possible to conduct the 3D image alignment by a PC or a server before showing onto a 3D display.

As described above, the feedback signal S29 in FIG. 2 could be the viewing distance from the viewer to the display. The feedback signal S29 can be obtained automatically or via user interaction. By obtaining the feedback, the image alignment module 208 can adjust the baseline of the left and right images during or after image warping or transformation.

An API (Application Interface) between the image alignment module 208 and an external button on the display can be made just like those buttons to adjust display contrast or brightness. Through the external button, a user can adjust their viewing conformability and the 3D effect, and then sends the user's request to the image alignment module 208.

The above configuration can be applied to other 3D display devices to make a user interface between a 3D processing module and a user.

FIG. 10a, FIG. 10b, and FIG. 10c show detailed explanations for different 3D effects. In FIG. 10a, the positive parallax is shown. A left object 9L that is the left-eye image is displayed on the left side of a display screen 900 and a right object 9R that is the right-eye image is displayed on the right side of the display screen 900. In this case, the observer perceives the object PO as being behind the display screen. The horizontal disparity is $d_x = x_R - x_L > 0$, when setting the origin at the bottom left of the display screen, for example. It is to be noted that, in the expression, $x_R$ is the position on the screen for the right-eye image and $x_L$ is the position on the screen for the left-eye image. The perceived depth of an object can be controlled by $d_x$. The depth perceived is larger as $d_x$ increases, while the depth perceived is smaller as $d_x$ decreases. In FIG. 10b, the zero parallax is shown. The left object 9L and the right object 9R are displayed on top of each other, on the display screen 900. In this case, the observer perceives the object PO as being on the display screen. The horizontal disparity is $d_x = x_R - x_L = 0$. In FIG. 10c, the negative parallax is shown. The left object 9L is displayed on the right side of the display screen 900 and the right object 9R is displayed on the left side of the display screen 900. In this case, the observer perceives the object PO as being in front of the display screen. The horizontal disparity is $d_x = x_R - x_L < 0$. It is necessary to adjust the horizontal disparity $d_x$ for producing a stereoscopic image pair for comfortable 3D viewing. One reason is because there is a limit of $d_x$ to the observer's eyes. Such limit is given by the interocular e (the distance between the left eye EL and the right eye ER). The interocular e is in a range of 50 mm-70 mm (65 mm in average). This means that the physical disparity between the left and right images on the display screen should not exceed the distance e.

It is to be noted that the stereoscopic image aligning apparatus 200 produces the same advantageous effects even when not all of the components described above are included.

For example, the stereoscopic image aligning apparatus 200 does not have to include the blur region detecting unit 220. This is because it is possible to detect corresponding points from an image including a blur, as well. It is to be noted that an image with lesser blur is preferable in detecting corresponding points. Thus, increased accuracy in detecting corresponding points can be expected with the blur region detecting unit 220, with a capturing condition where a large amount of hand movement is involved, for example.

In addition, the stereoscopic image aligning apparatus 200 does not have to include the second matrix computing unit 256. Generally speaking, it is rare that one image is extremely distorted with respect to the other image, or that a significant difference occurs in the aspect ratio. Thus, the advantageous effects of the present invention can be produced without the second matrix computing unit 256, by storing a predetermined skewing transformation matrix by the transforming unit 260 and applying the skewing transformation matrix to the third image, for example. It is to be noted that, by computation of the skewing transformation matrix according to capturing conditions performed by the second matrix computing unit 256, it is possible to provide an image with more natural stereoscopic effects. It is to be noted that, when the stereoscopic image aligning apparatus 200 does not include the second matrix computing unit 256, the transforming unit 260 transforms the first image using the homography transformation matrix computed by the first matrix computing unit 254.

Furthermore, the stereoscopic image aligning apparatus 200 does not have to include the viewing zone computing unit 262. It can be said generally that an region common to the left image the and right image does not significantly change every time. Thus, the second matrix computing unit 256 can determine a processing region in an image without the viewing zone calculating unit 262, by following a predetermined rule, for example, by specifying, as a viewing zone, a region that occupies 80% on the right of the left-eye image and a region that occupies 80% on the left of the right-eye image. Furthermore, the viewing zone can be specified more accurately by including the viewing zone calculating unit 262. As a result, it is possible to provide an image with more natural stereoscopic effects.

In addition, the stereoscopic image aligning apparatus 200 does not have to include the matrix combining unit 258. When the stereoscopic image aligning apparatus 200 does not include the second matrix computing unit 256, it is not necessary to include the matrix combining unit 258. In addition, even when the stereoscopic image aligning apparatus 200 includes the second matrix computing unit 256, the transforming unit 260 can perform transformation processing on the first image by sequentially using the homography transformation matrix and the skewing transformation matrix stored in a storage region. Therefore, it is possible to produce the same advantageous effect of the invention without performing the combining performed by the matrix combining unit 258.

It is to be noted that the image pair obtaining unit 205 according to Embodiment 1 may (A) obtain plural image pair candidates, (B) specify, for each of the image pair candidates, a common viewing zone that is a viewing zone common to each of the other image pair candidates and obtain quality information that is information related to at least one of the amount of light, brightness, color, and definition, and (C) select, as the image pair, the image pair candidate having the highest image quality indicated by the quality information. As a method for obtaining the plural image pairs in the above-described (A), for example, a user holds a digital still camera that is set in the continuous capturing mode and moves the hand holding the digital still camera in the horizontal direction, thereby enabling easy obtainment.

In addition, part or all of the functions of the stereoscopic image aligning apparatus 200 according to Embodiments 1 and 2 of the present invention may be implemented by executing a program by a processor such as a CPU.

Furthermore, the present invention may be the above-described program or a recording medium on which the above-described program is recorded. Furthermore, it should be understood that such a program can be distributed via a transmission medium such as the Internet.

INDUSTRIAL APPLICABILITY

The present invention can be applied to a stereoscopic image aligning apparatus and the like which detects corresponding points from plural image pairs and aligns the image pairs to meet a certain criterion. The present invention can be applied particularly to a stereoscopic image aligning apparatus and the like, which aligns image pairs to allow stereoscopic viewing on a stereoscopic display device.

REFERENCE SIGNS LIST

13LR, 14LR, 1100 image
102, 402, 406 left image
104, 404, 408, 410 right image
106 single sensor digital camera
108 distance
200 stereoscopic image aligning apparatus
202 storage media reader
204 image decoder
205 image pair obtaining unit
208 image alignment module
210 output unit
212 internal buffer
214 display device
216 storage/transmission device
218 printer
220 blur region detecting unit
252 corresponding point detecting unit
254 first matrix computing unit
256 second matrix computing unit
258 matrix combining unit
260 transforming unit
262 viewing zone computing unit
350, 352, 354, 504 right-eye image
355 line segment a"c"
356 line segment b"d"
362, 364a, 364b, 364c viewing zone
370, 372, 374, 376, 378 point
502 left-eye image
506, 508 inner rectangle
510 pre-transformation image
512 post-transformation image
514 pre-transformation viewing zone
516 post-transformation viewing zone
518, 520, 522, 524 point
528, 530, 532, 534 warped point
526, 540 angle
536 vertical difference
538 horizontal difference
900 display screen
L1302, L1304 difference line

The invention claimed is:

1. A stereoscopic image aligning apparatus, comprising:
an image pair obtaining unit configured to obtain an image pair including a left-eye image and a right-eye image that corresponds to the left-eye image;
a corresponding point detecting unit configured to detect a corresponding point that represents a set of a first point and a second point, the first point being included in a first image that is one of the images of the image pair, and the second point being included in a second image that is the other of the images of the image pair and corresponding to the first point;
a first matrix computing unit configured to compute a homography transformation matrix for transforming the first point such that a vertical parallax between the first point and the second point is smallest and an epipolar constraint is satisfied;
a transforming unit configured to transform the first image using the homography transformation matrix; and
an output unit configured to output a third image and the second image, the third image being the transformed first image.

2. The stereoscopic image aligning apparatus according to claim 1,
wherein said image pair obtaining unit is configured to obtain, as the image pair, two images concurrently captured using (i) two image sensors and two lenses, (ii) one image sensor and two lenses, or (iii) two image sensors and one lens.

3. The stereoscopic image aligning apparatus according to claim 1,
wherein said image pair obtaining unit is configured to obtain, as the image pair, two images captured at different times from different viewpoints, using one image sensor and one lens.

4. The stereoscopic image aligning apparatus according to claim 1, further comprising:
a second matrix computing unit configured to compute a skewing transformation matrix for transforming the third image such that a coordinate system of the third image has orthogonality and the third image has a same aspect ratio as an aspect ratio of the first image; and
a matrix combining unit configured to generate a combined transformation matrix by combining the homography transformation matrix and the skewing transformation matrix, wherein said transforming unit is configured to transform the first image using the combined transformation matrix.

5. The stereoscopic image aligning apparatus according to claim 4, further comprising
a viewing zone computing unit configured to compute a viewing zone that is a region common to the first image and the second image,
wherein said second matrix computing unit is configured to compute the skewing transformation matrix such that a coordinate system of a portion included in the viewing zone of the third image has the orthogonality and the portion included in the viewing zone of the third image has a same aspect ratio as an aspect ratio of a portion included in the viewing zone of the first image.

6. The stereoscopic image aligning apparatus according to claim 1,
wherein said corresponding point detecting unit is configured to select small regions evenly distributed in a predetermined area extending from a center of each of the first image and the second image included in the image pair and detect the corresponding point from the small regions.

7. The stereoscopic image aligning apparatus according to claim 1, further comprising
a blur region detecting unit configured to detect a blur region in the image pair,
wherein said corresponding point detecting unit is configured to detect the corresponding point from regions other than the blur region in the image pair.

8. The stereoscopic image aligning apparatus according to claim 1,
wherein said output unit is configured to obtain adjustment information that indicates at least one of an input operation from a viewing user, a size of a display device, and a distance between the display device and the viewing user, and to adjust and output at least one of a parallax between the third image and the second image, a three-dimensional (3D) pop-up effect, and a 3D deep-in effect, based on the adjustment information.

9. The stereoscopic image aligning apparatus according to claim 1,
wherein said image pair obtaining unit is configured to (A) obtain a plurality of image pair candidates each of which is a candidate for the image pair, (B) specify, for each of the image pair candidates, a common viewing zone that is a viewing zone common to the image pair candidate and an other image pair candidate and obtain quality information that is information related to at least one of an amount of light, brightness, color, and definition, in the common viewing zone, and (C) select, as the image pair, one of the image pair candidates having a highest image quality indicated by the quality information.

10. The stereoscopic image aligning apparatus according to claim 1,
wherein, when (i) an image group is encoded and stored in a memory card or (ii) the image group is encoded and transmitted from an external device through a network, said image pair obtaining unit is configured to decode the encoded image group, the image group including the left-eye image and the right-eye image.

11. The stereoscopic image aligning apparatus according to claim 1,
wherein said corresponding point detecting unit is configured to compute a rotation parameter and a shift parameter so as to match the rotation parameter and the shift parameter to an output from a Gyro sensor that outputs information corresponding to a rotation angle, the rotation parameter and the shift parameter being for use in generating the homography transformation matrix.

12. The stereoscopic image aligning apparatus according to claim 1,
wherein said stereoscopic image aligning apparatus is (i) incorporated in a two-dimensional (2D) camera to form a 3D camera, (ii) incorporated in a 3D display as a 3D processing engine to convert a group of 2D images into 3D images or 3D video, and (ii) incorporated in a player or a recorder to convert the group of 2D images into the 3D images or the 3D video.

13. A stereoscopic image aligning method, comprising:
obtaining an image pair including a left-eye image and a right-eye image that corresponds to the left-eye image;
detecting a corresponding point that represents a set of a first point and a second point, the first point being included in a first image that is one of the images of the image pair, and the second point being included in a second image that is the other of the images of the image pair and corresponding to the first point;
computing a homography transformation matrix for transforming the first point such that the first point and the second point have a same vertical position value and an epipolar constraint is satisfied;
transforming the first image using the homography transformation matrix; and
outputting a third image and the second image, the third image being the transformed first image.

14. A non-transitory computer-readable recording medium having a program recorded thereon for causing the computer to execute the stereoscopic image aligning method according to claim 13.

15. An integrated circuit comprising:
an image pair obtaining unit configured to obtain an image pair including a left-eye image and a right-eye image;
a corresponding point detecting unit configured to detect a corresponding point that represents a set of a first point and a second point, the first point being included in a first image that is one of the images included in the image pair, and the second point being included in a second image that is the other of the images of the image pair and corresponding to the first point;
a first matrix computing unit configured to compute a homography transformation matrix for transforming the first point such that the first point and the second point have a same vertical position value and an epipolar constraint is satisfied;
a transforming unit configured to transform the first image using the homography transformation matrix; and
an output unit configured to output a third image and the second image, the third image being the transformed first image.

16. A digital still camera comprising the stereoscopic image aligning apparatus according to claim 3.

17. The stereoscopic image aligning apparatus according to claim 3, further comprising
a blur region detecting unit configured to detect a blur region in the image pair,
wherein said corresponding point detecting unit is configured to detect the corresponding point from regions other than the blur region in the image pair.

* * * * *